United States Patent
Kunimi et al.

(10) Patent No.: US 10,336,865 B2
(45) Date of Patent: *Jul. 2, 2019

(54) LIQUID CRYSTAL ALIGNING AGENT, LIQUID CRYSTAL ALIGNMENT FILM AND LIQUID CRYSTAL DISPLAY DEVICE

(71) Applicant: NISSAN CHEMICAL INDUSTRIES, LTD., Chiyoda-ku (JP)

(72) Inventors: Naho Kunimi, Funabashi (JP); Naoki Sakumoto, Funabashi (JP); Atsuhiko Mandai, Funabashi (JP)

(73) Assignee: Nissan Chemical Industries, Ltd., Chiyoda-ku (JP)

( * ) Notice: Subject to any disclaimer, the term of this patent is extended or adjusted under 35 U.S.C. 154(b) by 323 days.

This patent is subject to a terminal disclaimer.

(21) Appl. No.: 15/031,627

(22) PCT Filed: Oct. 22, 2014

(86) PCT No.: PCT/JP2014/078147
§ 371 (c)(1),
(2) Date: Apr. 22, 2016

(87) PCT Pub. No.: WO2015/060366
PCT Pub. Date: Apr. 30, 2015

(65) Prior Publication Data
US 2016/0244566 A1  Aug. 25, 2016

(30) Foreign Application Priority Data

Oct. 23, 2013  (JP) ................. 2013-220596

(51) Int. Cl.
| C08G 73/10 | (2006.01) |
| G02F 1/1337 | (2006.01) |
| B05D 3/00 | (2006.01) |
| C09K 19/56 | (2006.01) |

(52) U.S. Cl.
CPC ......... *C08G 73/1071* (2013.01); *B05D 3/007* (2013.01); *C08G 73/10* (2013.01); *C08G 73/1067* (2013.01); *C09K 19/56* (2013.01); *G02F 1/133723* (2013.01); *G02F 1/133788* (2013.01); *G02F 2001/133738* (2013.01)

(58) Field of Classification Search
None
See application file for complete search history.

(56) References Cited

FOREIGN PATENT DOCUMENTS

| JP | 9-297313 A | 11/1997 |
| JP | 2011-107266 A | 6/2011 |
| WO | WO 2011/115077 A1 | 9/2011 |
| WO | WO 2012/133826 A1 | 10/2012 |
| WO | WO-2012133829 A1 * | 10/2012 ............. C09K 19/56 |

OTHER PUBLICATIONS

Machine translation of WO2012133829 from its JP6056752 publication (retrieved Feb. 2018).*
International Search Report dated Jan. 6, 2015 in PCT/JP2014/078147.
Masatoshi Kidowaki, et al., "Photocontrolled Liquid Crystal Aligning Films" Functional Materials, vol. 17, No. 11, Nov. 1997, pp. 13-22.

* cited by examiner

*Primary Examiner* — Joel G Horning
(74) *Attorney, Agent, or Firm* — Oblon, McClelland, Maier & Neustadt, L.L.P.

(57) ABSTRACT

To provide a liquid crystal aligning agent to obtain a liquid crystal alignment film which has favorable seal adhesion and a favorable residual image property, and which is excellent in removability of a decomposed product formed after irradiation with ultraviolet rays.
A liquid crystal aligning agent containing at least one polymer selected from the group consisting of a polyimide precursor having structural units represented by the formula (1) and structural units represented by the formula (2) and an imidized polymer of the polyimide precursor:

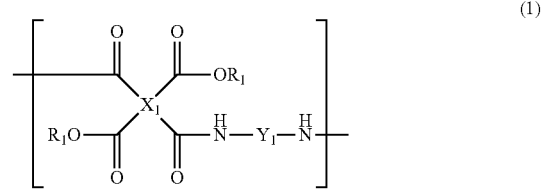

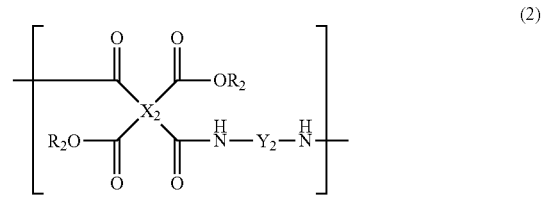

wherein $X_1$ and $X_2$ are a tetravalent organic group, $Y_1$ and $Y_2$ are a bivalent organic group, and $R_1$ and $R_2$ are a hydrogen atom or a $C_{1-5}$ alkyl group.

16 Claims, No Drawings

LIQUID CRYSTAL ALIGNING AGENT, LIQUID CRYSTAL ALIGNMENT FILM AND LIQUID CRYSTAL DISPLAY DEVICE

TECHNICAL FIELD

The present invention relates to a liquid crystal aligning agent for preparation of a liquid crystal alignment film, a liquid crystal alignment film obtained from the liquid crystal aligning agent, and a liquid crystal display device. More particularly, it relates to a liquid crystal aligning agent to be used for formation of a liquid crystal alignment film to which liquid crystal alignment performance can be imparted by a photo-alignment method i.e. by irradiation with polarized ultraviolet rays instead of rubbing treatment, a liquid crystal alignment film obtained from the liquid crystal aligning agent, and a liquid crystal display device.

BACKGROUND ART

A liquid crystal display device used for a liquid crystal television, a liquid crystal display, etc. usually has a liquid crystal alignment film to control the liquid crystal alignment state provided therein. As the liquid crystal alignment film, a polyimide liquid crystal alignment film obtained by applying a liquid crystal aligning agent containing as the main component a solution of a polyimide precursor such as a polyamic acid (polyamide acid) or a soluble polyimide to a glass substrate or the like and baking it is mainly used. At present, by the industrially most common method, a liquid crystal alignment film is prepared by carrying out so-called rubbing treatment such that the surface of a polyimide liquid crystal alignment film formed on an electrode substrate is rubbed in one direction with a cloth of e.g. cotton, nylon or polyester.

A method of applying a rubbing treatment to the film surface in the alignment procedure of the liquid crystal alignment film, is an industrially useful method which is easily conducted and is excellent in the productivity. However, demands for higher performance, high definition and increase in the size of a liquid crystal display device are increasing, and various problems have been revealed such as scars on the surface of the alignment film formed by the rubbing treatment, influences by dust, mechanical force and static electricity, and non-uniformity in the alignment film plane.

As an alternative to the rubbing treatment, a photo-alignment method of imparting liquid crystal alignment performance by irradiation with polarized ultraviolet rays has been known. As the liquid crystal alignment treatment by the photo-alignment method, in terms of mechanism, one utilizing photoisomerization reaction, one utilizing photo-crosslinking reaction, one utilizing photodecomposition reaction, etc. have been proposed (Non-Patent Document 1). Further, in Patent Document 1, use of a polyimide film having an alicyclic structure such as a cyclobutane ring in its main chain for photo-alignment method has been proposed.

The above photo-alignment method is not only advantageous in that a liquid crystal alignment film can be produced by an industrially easy production process but also has the following advantages. That is, in an in-plane switching (IPS) mode liquid crystal display device in which an electric field is applied to a substrate in a horizontal direction (a transverse direction) for switching the orientation of liquid crystal molecules or a fringe field switching (hereinafter referred to as FFS) mode liquid crystal display device, by using a liquid crystal alignment film obtained by the above photo-alignment method, as compared with a liquid crystal alignment film obtained by the rubbing treatment method, improvement of the contrast and the viewing angle of a liquid crystal display device can be expected.

A liquid crystal alignment film to be used for an IPS mode or FFS mode liquid crystal display device is not only required to have basic properties such as excellent liquid crystal alignment property and electrical properties but also required to suppress a residual image which occurs due to long-term alternative-current drive in an IPS mode or FFS mode liquid crystal display device.

However, a liquid crystal alignment film obtained by the photo-alignment method is problematic in that the anisotropy to the alignment direction of a polymer film is small as compared with a film obtained by rubbing. If the anisotropy is small, no sufficient liquid crystal alignment property will be obtained, and when such a liquid crystal alignment film is used for a liquid crystal display device, problems may arise such that a residual image occurs. Thus, as a method for increasing the anisotropy of a liquid crystal alignment film obtained by the photo-alignment method, removal of low molecular weight components (decomposed products) formed by cleavage of the main chain of the polyimide by irradiation with light, by heating, has been proposed (Patent Document 2).

Further, in order to broaden the effective pixel area of a liquid crystal display device in recent years, it has been required to reduce a so-called picture frame area on which pixels are not formed on the peripheral edge portion of a substrate. As the picture frame of a panel is narrowed, a sealing agent for bonding two substrates to prepare a liquid crystal display device is applied on a polyimide liquid crystal alignment film, however, since a polyimide has no polar group, no covalent bond is formed between the sealing agent and the surface of the liquid crystal alignment film, and adhesion of the substrates may be insufficient.

PRIOR ART DOCUMENTS

Patent Documents

Patent Document 1: JP-A-H09-297313
Patent Document 2: JP-A-2011-107266

Non-Patent Document

Non-Patent Document 1: "Photocontrolled Liquid Crystal Aligning Films" Kidowaki, Ichimura, Functional Materials, November 1997, Vol. 17, No. 11, pp. 13-22

DISCLOSURE OF INVENTION

Technical Problem

It is an object of the present invention to provide a liquid crystal aligning agent with which a liquid crystal alignment film excellent in the bonding property (adhesion) to a sealing agent and a substrate in a liquid crystal display device even when liquid crystal alignment performance is imparted by a photo-alignment method of irradiating the film with polarized radioactive rays, can be obtained.

Further, another object of the present invention is to provide a liquid crystal alignment film with which an IPS mode or FFS mode liquid crystal display device having favorable residual image property after long-term drive and showing excellent black brightness (contrast) can be obtained.

Solution to Problem

The present inventors have conducted extensive studies and as a result, found that the above objects can be achieved by a liquid crystal aligning agent containing at least one polymer selected from the group consisting of a polyimide precursor obtained from an aromatic diamine having an aliphatic amino group substituted with a protecting group to be replaced with a hydrogen atom by heat (hereinafter sometimes referred to as a thermally-leaving group) and a tetracarboxylic dianhydride having a cyclobutane structure, and an imidized polymer of the polyimide precursor, and accomplished the present invention.

1. A liquid crystal aligning agent containing at least one polymer selected from the group consisting of a polyimide precursor having structural units represented by the following formula (1) and structural units represented by the following formula (2) and an imidized polymer of the polyimide precursor:

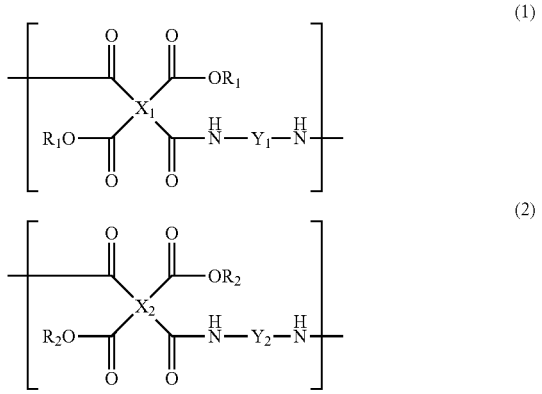

wherein each of $X_1$ and $X_2$ is a tetravalent organic group represented by the formula (XA-1), $Y_1$ is a bivalent organic group represented by the following formula (Y1-1), $Y_2$ is a bivalent organic group represented by the following formula (Y2-1) or (Y2-2), and each of $R_1$ and $R_2$ which are independent of each other, is a hydrogen atom or a $C_{1-5}$ alkyl group:

wherein each of $R_3$, $R_4$, $R_5$ and $R_6$ which are independent of one another, is a hydrogen atom, a halogen atom, a $C_{1-6}$ alkyl group, a $C_{2-6}$ alkenyl group, a $C_{2-6}$ alkynyl group or a phenyl group;

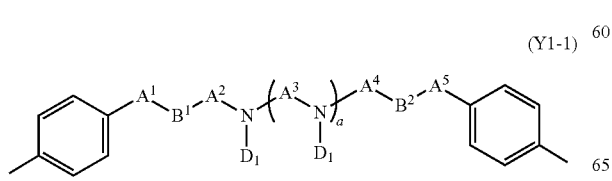

wherein each of $A^1$ and $A^5$ which are independent of each other, is a single bond or a $C_{1-5}$ alkylene group, each of $A^2$ and $A^4$ which are independent of each other, is a $C_{1-5}$ alkylene group, $A^3$ is a $C_{1-6}$ alkylene group or a cycloalkylene group, each of $B^1$ and $B^2$ which are independent of each other, is a single bond, —O—, —NH—, —NMe-, —C(=O)—, —C(=O)O—, —C(=O)NH—, —C(=O)NMe-, —OC(=O)—, —NHC(=O)— or —N(Me)C(=O)—, $D_1$ is a group to be replaced with a hydrogen atom by heat, and a is 0 or 1;

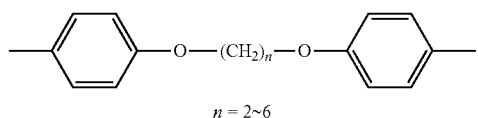

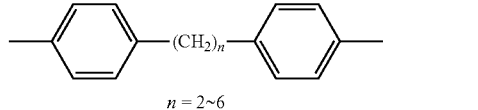

2. The liquid crystal aligning agent according to the above 1, wherein the polyimide precursor has the structural units represented by the formula (1) in an amount of from 20 to 80 mol % and the structural units represented by the formula (2) in an amount of from 80 to 20 mol % based on all the structural units.

3. The liquid crystal aligning agent according to the above 1 or 2, wherein $Y_1$ in the structural units represented by the above formula (1) is at least one member selected from the group consisting of structures represented by the following formulae (1-1) to (1-4):

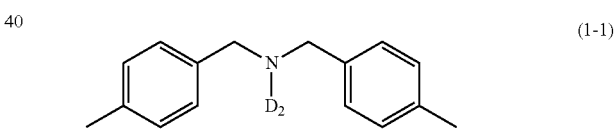

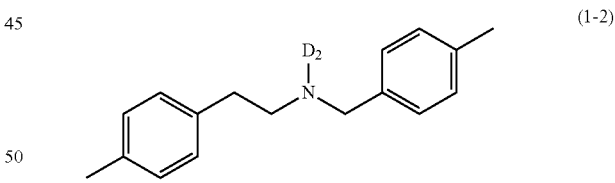

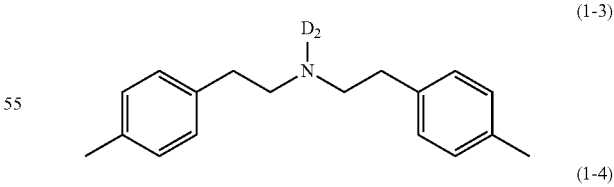

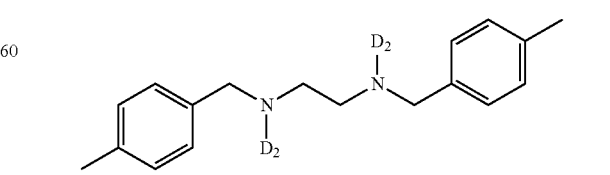

wherein $D_2$ is a tert-butoxycarbonyl group.

4. The liquid crystal aligning agent according to any one of the above 1 to 3, wherein $Y_1$ in the structural units represented by the above formula (1) is represented by the above formula (1-2).

5. The liquid crystal aligning agent according to any one of the above 1 to 4, wherein $Y_2$ in the structural units represented by the above formula (2) is represented by the following formula (Y2-3):

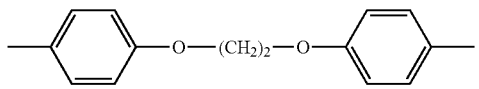
(Y2-3)

6. The liquid crystal aligning agent according to any one of the above 1 to 5, wherein each of $X_1$ in the structural units represented by the above formula (1) and $X_2$ in the structural units represented by the above formula (2) which are independent of each other, is represented by the following formula (X1-1) or (X1-2):

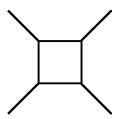
(X1-1)

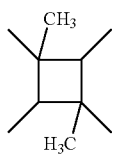
(X1-2)

7. A method for producing a liquid crystal alignment film, which comprises applying and baking the liquid crystal aligning agent as defined in any one of the above 1 to 6 to form a film, irradiating the obtained film with polarized ultraviolet rays, and subjecting the film to a contact treatment with water or with a mixed solvent of water and an organic solvent.

8. The method for producing a liquid crystal alignment film according to the above 7, wherein the mixed solvent of water and an organic solvent contains water and an organic solvent in a mass ratio of from 20/80 to 80/20.

9. The method for producing a liquid crystal alignment film according to the above 7 or 8, wherein the organic solvent is 2-propanol, methanol, ethanol, 1-methoxy-2-propanol, ethyl lactate, diacetone alcohol, methyl 3-methoxypropionate or ethyl 3-ethoxypropionate.

10. The method for producing a liquid crystal alignment film according to any one of the above 7 to 9, wherein the organic solvent is 2-propanol, methanol or ethanol.

11. The method for producing a liquid crystal alignment film according to any one of the above 7 to 10, wherein after the contact treatment, the film is heated at 150° C. or higher.

12. A liquid crystal alignment film obtained by the method for producing a liquid crystal alignment film as defined in any one of the above 7 to 11.

13. A liquid crystal display device having the liquid crystal alignment film as defined in the above 12.

Advantageous Effects of Invention

According to the liquid crystal aligning agent of the present invention, a liquid crystal alignment film excellent in the adhesion to a sealing agent is obtained. By using such a liquid crystal alignment film, a liquid crystal display device which is excellent in the adhesion between substrates and is resistant to an impact is obtained. The mechanism as to why the adhesion to a sealing agent improves is not necessarily understood clearly, but is considered to be such that the protecting group leaves to form an amino group by heating and as a result, the amino group which is a polar group is exposed to the surface of the liquid crystal alignment film, and by the interaction between the amino group and a functional group in the sealing agent, the adhesion between the liquid crystal alignment film and the sealing agent improves.

From the liquid crystal alignment film formed from the liquid crystal aligning agent of the present invention, even when liquid crystal alignment performance is imparted by a photo-alignment method of irradiating the liquid crystal alignment film with polarized radioactive rays, a decomposed product of e.g. a polymer constituting the liquid crystal alignment film, formed by irradiation, can easily and efficiently be removed by a contact treatment with an aqueous liquid. The mechanism as to why the decomposed product can easily be removed is not necessarily understood clearly, but is considered to be such that the amino group formed by heating improves the solubility of the decomposed product in an aqueous liquid.

Further, by using the liquid crystal aligning agent of the present invention for an IPS mode or FFS mode liquid crystal display device, a liquid crystal display device having favorable residual image property after long-term drive and showing excellent black brightness (contrast) can be obtained.

DESCRIPTION OF EMBODIMENTS

Liquid Crystal Aligning Agent

The liquid crystal aligning agent of the present invention is a liquid crystal aligning agent containing at least one polymer selected from the group consisting of a polyimide precursor having structural units represented by the following formula (1) and structural units represented by the following formula (2) and an imidized polymer of the polyimide precursor. In the present invention, the structural units represented by the formula (1) and the structural units represented by the formula (2) may be present in the same polyimide precursor, or the structural units represented by the formula (1) and the structural units represented by the formula (2) may be present in separate polyimide precursors.

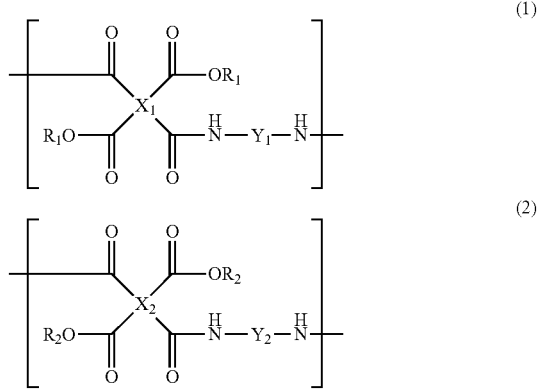

In the formulae (1) and (2), each of $X_1$ and $X_2$ is a tetravalent organic group represented by the following formula (XA-1):

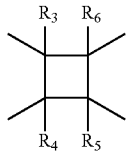
(XA-1)

In the formula (XA-1), each of $R_3$, $R_4$, $R_5$ and $R_6$ which are independent of one another, is a hydrogen atom, a halogen atom, a $C_{1-6}$ alkyl group, a $C_{2-6}$ alkenyl group, a $C_{2-6}$ alkynyl group or a phenyl group. In view of the liquid crystal alignment property, each of $R_3$, $R_4$, $R_5$ and $R_6$ which are independent of one another, is preferably a hydrogen atom, a halogen atom, a methyl group or an ethyl group, more preferably a hydrogen atom or a methyl group.

Each of $X_1$ and $X_2$ which are independent of each other, is preferably a tetravalent organic group represented by the following formula (X1-1) or (X1-2):

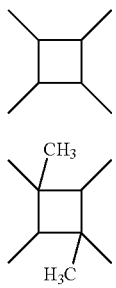

(X1-1)

(X1-2)

In the above formulae (1) and (2), $Y_1$ is a bivalent organic group represented by the following formula (Y1-1), $Y_2$ is a bivalent organic group represented by the following formula (Y2-1) or (Y2-2), and each of $R_1$ and $R_2$ which are independent of each other, is a hydrogen atom or a $C_{1-5}$ alkyl group. Each of $R_1$ and $R_2$ which are independent of each other, is preferably a hydrogen atom or a methyl group in view of easiness of imidization by heating.

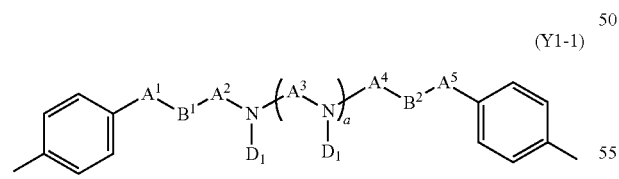
(Y1-1)

In the formula (Y1-1), each of $A^1$ and $A^5$ which are independent of each other, is a single bond or a $C_{1-5}$ alkylene group, and in view of the reactivity with a functional group in the sealing agent, it is preferably a single bond or a methylene group. Each of $A^2$ and $A^4$ is a $C_{1-5}$ alkylene group, preferably a methylene group or an ethylene group.

$A^3$ is a $C_{1-6}$ alkylene group or a cycloalkylene group, and in view of the reactivity with a functional group in the sealing agent, preferably a methylene group or an ethylene group.

Each of $B^1$ and $B^2$ which are independent of each other, is a single bond, —O—, —NH—, —NMe-, —C(=O)—, —C(=O)O—, —C(=O)NH—, —C(=O)NMe-, —OC(=O)—, —NHC(=O)— or —N(Me)C(=O)—, and in view of the liquid crystal alignment property of the obtainable liquid crystal alignment film, preferably a single bond or —O—.

$D_1$ is a thermally-leaving group which is to be replaced with a hydrogen atom by heat. $D_1$ is not particularly limited so long as it is a protecting group for an amino group and is a functional group to be replaced with a hydrogen atom by heat. In view of the storage stability of the liquid crystal aligning agent, the thermally-leaving group is preferably a group which does not leave at room temperature, and is a protecting group which leaves by heat preferably at 80° C. or higher, more preferably at 100° C. or higher, particularly preferably at 120° C. or higher. The temperature at which it leaves is preferably at most 250° C., more preferably at most 230° C. Too high a temperature at which it leaves is not preferred since it may lead to decomposition of a polymer.

$D_1$ is preferably a tert-butoxycarbonyl group or a 9-fluorenylmethoxycarbonyl group, in view of the temperature at which it leaves.

a is 0011.

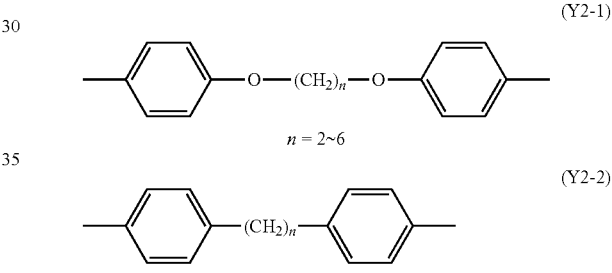

(Y2-1)

$n = 2~6$ (Y2-2)

$n = 2~6$

In the structural units represented by the above formula (1), two or more different types of $Y_1$ may be present. As its specific examples, the following formulae (1-1) to (1-21) may be mentioned.

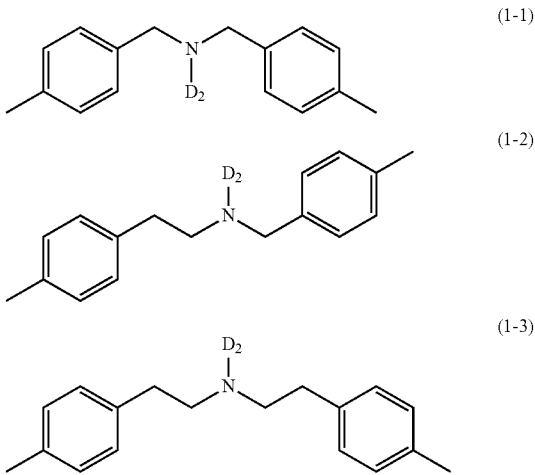

(1-1)

(1-2)

(1-3)

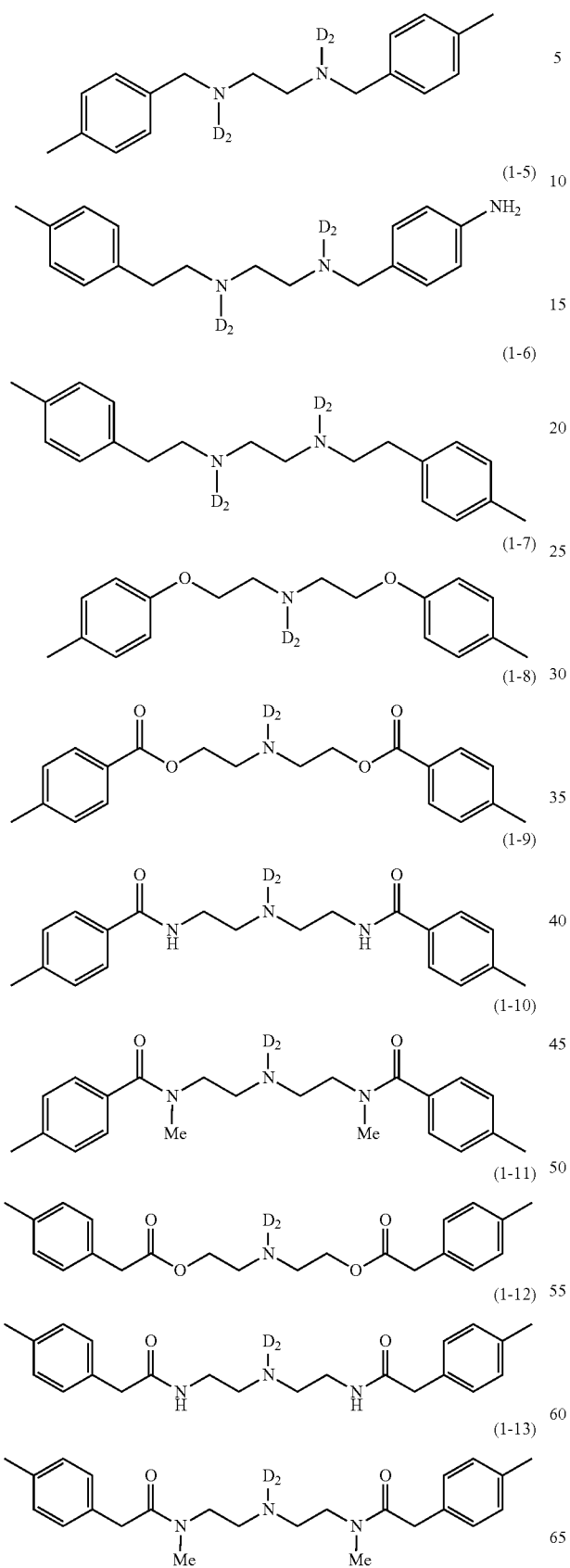
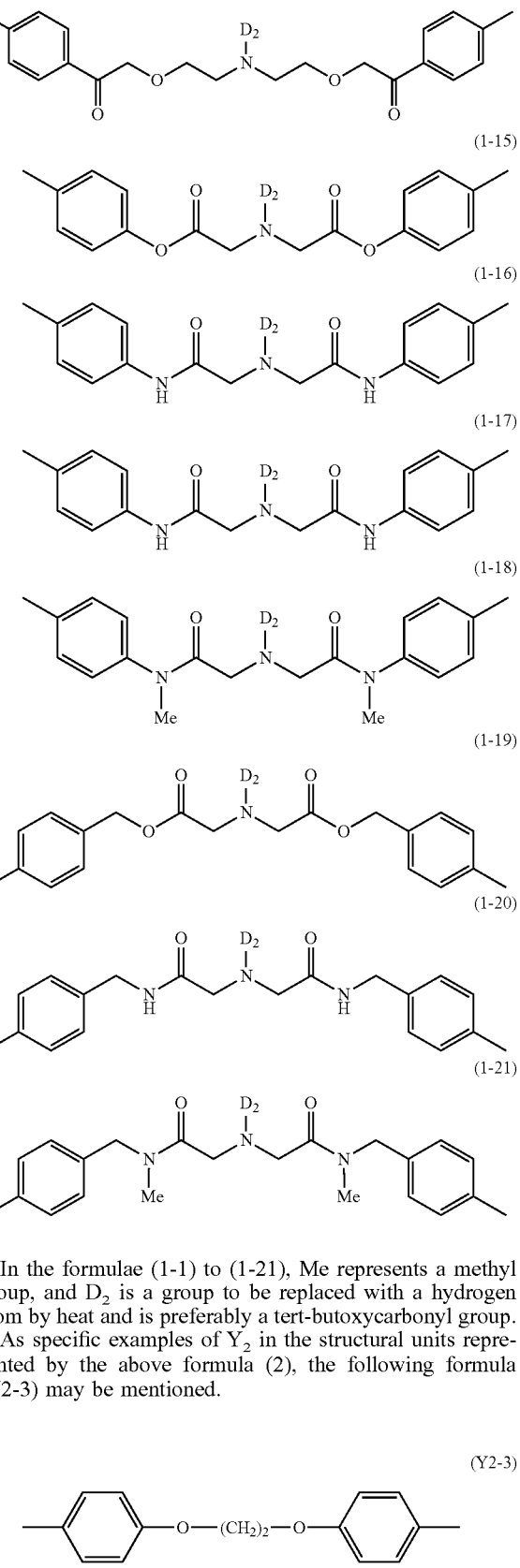
In the formulae (1-1) to (1-21), Me represents a methyl group, and $D_2$ is a group to be replaced with a hydrogen atom by heat and is preferably a tert-butoxycarbonyl group.
As specific examples of $Y_2$ in the structural units represented by the above formula (2), the following formula (Y2-3) may be mentioned.

In at least one polymer selected from the group consisting of the polyimide precursor having the structural units represented by the above formula (1) and an imidized polymer of the polyimide precursor, the proportion of the structural units represented by the above formula (1) is preferably from 20 to 80 mol %, more preferably from 30 to 60 mol % based on all the structural units.

In at least one polymer selected from the group consisting of the polyimide precursor having the structural units represented by the above formula (2) and an imidized polymer of the polyimide precursor, the proportion of the structural units represented by the above formula (2) is preferably from 20 to 80 mol % based on all the structural units, and in view of the liquid crystal alignment property, more preferably from 30 to 70 mol %.

<Production of Polyimide Precursor: Production of Polyamic Acid>

A polyamic acid which is the polyimide precursor having structural units represented by the formula (1) and structural units represented by the formula (2) in the present invention is produced by the following method. In the present invention, the polyimide precursor may be produced by separately producing a polyimide precursor having structural units represented by the formula (1) and a polyimide precursor having structural units represented by the formula (2) and mixing them.

Otherwise, as mentioned below, it is preferred to produce a polyimide precursor having structural units represented by the formula (1) and structural units represented by the formula (2) by using at least one type of diamine to give structural units represented by the formula (1) and at least one type of diamine to give structural units represented by the formula (2) as diamines to be subjected to polycondensation with tetracarboxylic acid or its dianhydride.

In such a case, it is produced by subjecting tetracarboxylic acid to give $X_1$ in the formula (1) or its dianhydride and tetracarboxylic acid to give $X_2$ in the formula (2) or its dianhydride, and a diamine to give $Y_1$ and a diamine to give $Y_2$, to polycondensation in the presence of an organic solvent at from $-20°$ C. to $150°$ C., preferably from $0°$ C. to $50°$ C. for from 30 minutes to 24 hours, preferably for from 1 to 12 hours.

The reaction of the diamines and tetracarboxylic acid is usually carried out in an organic solvent. The organic solvent to be used is not particularly limited so long as the formed polyimide precursor is soluble in it. Specific examples of the organic solvent to be used for the reaction are mentioned below, however, it is not limited to such specific examples.

For example, N-methyl-2-pyrrolidone, N-ethyl-2-pyrrolidone or γ-butyrolactone, N,N-dimethylformamide, N,N-dimethylacetamide, dimethyl sulfoxide or 1,3-dimethyl-imidazolidinone may be mentioned. Further, in a case where the solubility of the polyimide precursor in a solvent is high, methyl ethyl ketone, cyclohexanone, cyclopentanone, 4-hydroxy-4-methyl-2-pentanone or an organic solvent represented by any of the following formulae [D-1] to [D-3] may be used.

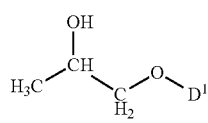

[D-1]

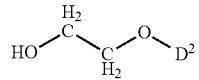

[D-2]

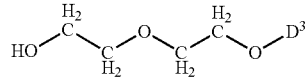

[D-3]

In the formula [D-1], $D^1$ represents a $C_{1-3}$ alkyl group, in the formula [D-2], $D^2$ represents a $C_{1-3}$ alkyl group, and in the formula [D-3], $D^3$ represents a $C_{1-4}$ alkyl group.

Such solvents may be used alone or as mixed. Further, even a solvent in which the polyimide precursor is not soluble may be used as mixed with the above solvent within a range where the formed polyimide precursor will not precipitate. Further, moisture in the solvent will inhibit the polymerization reaction and further may cause hydrolysis of the formed polyimide precursor, and accordingly, the solvent is preferably dehydrated.

The concentration of the polyamic acid polymer in the reaction system is preferably from 1 to 30 mass %, more preferably from 5 to 20 mass %, whereby precipitation of the polymer is less likely to occur, and a high molecular weight product tends to be obtained.

By pouring the reaction solution of the polyamic acid obtained as mentioned above into a poor solvent with well stirring, the polymer can be precipitated and recovered. Further, a purified powder of the polyamic acid can be obtained by carrying out precipitation several times, and washing the precipitates with a poor solvent and drying them at room temperature or by heating. The poor solvent is not particularly limited and may, for example, be water, methanol, ethanol, hexane, butyl cellosolve, acetone or toluene.

<Production of Polyimide Precursor: Production of Polyamic Acid Ester>

In a case where the polyimide precursor of the present invention is a polyamic acid ester, it may be produced by the following process (A), (B) or (C).

(A) Production from Polyamic Acid

The polyamic acid ester may be produced by esterifying the above-produced polyamic acid. Specifically, it may be produced by reacting the polyamic acid and an esterifying agent in the presence of an organic solvent at from $-20°$ C. to $150°$ C., preferably from $0°$ C. to $50°$ C. for from 30 minutes to 24 hours, preferably from 1 to 4 hours.

The esterifying agent is preferably one which can readily be removed by purification, and may, for example, be N,N-dimethylformamide dimethyl acetal, N,N-dimethylformamide diethyl acetal, N,N-dimethylformamide dipropyl acetal, N,N-dimethylformamide dineopentylbutyl acetal, N,N-dimethylformamide di-t-butyl acetal, 1-methyl-3-p-tolyltriazene, 1-ethyl-3-p-tolyltriazene, 1-propyl-3-p-tolyltriazene or 4-(4,6-dim ethoxy-1,3,5-triazin-2-yl)-4-methylmorpholinium chloride. The amount of the esterifying agent is preferably from 2 to 6 molar equivalent per 1 mole of the repeating units of the polyamic acid.

The solvent to be used for the above reaction is preferably N,N-dimethylformamide, N-methyl-2-pyrrolidone or γ-butyrolactone in view of the solubility of the polymer, and they may be used alone or as a mixture of two or more. The concentration at the time of production is preferably from 1 to 30 mass %, more preferably from 5 to 20 mass %, whereby precipitation of the polymer is less likely to occur, and a high molecular weight product tends to be obtained.

(B) Production by Reaction of Tetracarboxylic Acid Diester Dichloride and Diamine The polyamic acid ester may be produced from tetracarboxylic acid diester dichloride and a diamine.

Specifically, the polyamic acid ester may be produced by reacting tetracarboxylic acid diester dichloride and a diamine in the presence of a base and an organic solvent at from −20 to 150° C., preferably from 0 to 50° C. for from 30 minutes to 24 hours, preferably from 1 to 4 hours.

As the base, pyridine, triethylamine, 4-dimethylaminopyridine or the like may be used, and pyridine is preferred, whereby the reaction will moderately proceed. The amount of the base is preferably from 2 to 4 molar times based on tetracarboxylic acid diester dichloride, whereby the base will easily be removed, and a high molecular weight product tends to be obtained.

The solvent to be used for the above reaction is preferably N-methyl-2-pyrrolidone or γ-butyrolactone in view of the solubility of the monomer and the polymer, and they may be used alone or as a mixture of two or more. The polymer concentration at the time of production is preferably from 1 to 30 mass %, more preferably from 5 to 20 mass %, whereby precipitation of the polymer is less likely to occur, and a high molecular weight product tends to be obtained. Further, in order to prevent hydrolysis of tetracarboxylic acid diester dichloride, the solvent to be used for production of the polyamic acid ester is preferably dehydrated as far as possible, and it is preferred to carry out the reaction in a nitrogen atmosphere while inclusion of outdoor air is prevented.

(C) Production from Tetracarboxylic Acid Diester and Diamine

The polyamic acid ester may be produced by subjecting tetracarboxylic acid diester and a diamine to polycondensation.

Specifically, the polyamic acid ester may be produced by reacting tetracarboxylic acid diester and a diamine in the presence of a condensation agent, a base and an organic solvent at from 0° C. to 150° C., preferably from 0° C. to 100° C. for from 30 minutes to 24 hours, preferably from 3 to 15 hours.

The condensation agent may, for example, be triphenyl phosphite, dicyclohexylcarbodiimide, 1-ethyl-3-(3-dimethylaminopropyl)carbodiimide hydrochloride, N,N'-carbonyldiimidazole, dimethoxy-1,3,5-triazinylmethyl morpholinium, O-(benzotriazol-1-yl)-N,N,N',N'-tetramethyluronium tetrafluoroborate, O-(benzotriazol-1-yl)-N,N,N',N'-tetramethyluronium hexafluorophosphate or diphenyl (2,3-dihydro-2-thioxo-3-benzoxazolyl)phosphonate. The amount of the condensation agent is preferably from 2 to 3 molar times based on tetracarboxylic acid diester.

As the base, a tertiary amine such as pyridine or triethylamine may be used. The amount of the base is preferably from 2 to 4 molar times based on the diamine, whereby the base will easily be removed, and a high molecular weight product tends to be obtained.

Further, in the above reaction, the reaction will efficiently proceed by adding a Lewis acid as an additive. The Lewis acid is preferably a lithium halide such as lithium chloride or lithium bromide. The amount of the Lewis acid is preferably from 0 to 1.0 molar time based on the diamine.

Among the above three processes for producing the polyamic acid ester, particularly preferred is the process (A) or (B), whereby a high molecular weight polyamic acid ester will be obtained.

By pouring the solution of the polyamic acid ester obtained as mentioned above into a poor solvent with well stirring, the polymer can be precipitated. Precipitation is carried out several times, and the precipitate is washed with a poor solvent and dried at room temperature or by heating, whereby a powder of a purified polyamic acid ester can be obtained. The poor solvent is not particularly limited and may, for example, be water, methanol, ethanol, hexane, butyl cellosolve, acetone or toluene.

<Polyimide>

The polyimide to be used in the present invention may be produced by imidizing the above polyamic acid ester or polyamic acid, which is the polyimide precursor. In a case where the polyimide is produced from the polyamic acid ester, chemical imidization of adding a basic catalyst to the above polyamic acid ester solution or a polyamic acid solution obtained by dissolving the polyamic acid ester resin powder in an organic solvent is easily conducted. Chemical imidization is preferred in that the imidization reaction will proceed at a relatively low temperature, and a decrease in the molecular weight of the obtainable polymer is less likely to occur in the procedure of imidization.

Chemical imidization may be carried out by stirring the polyamic acid ester to be imidized in an organic solvent in the presence of a basic catalyst. As the organic solvent, the solvent to be used in the above-described polymerization reaction may be used. The basic catalyst may, for example, be pyridine, triethylamine, trimethylamine, tributylamine or trioctylamine. Among them, triethylamine, which has sufficient basicity to make the reaction proceed, is preferred.

The temperature at which the imidization reaction is carried out is from −20° C. to 140° C., preferably from 0° C. to 100° C., and the reaction time is from 1 to 100 hours. The amount of the basic catalyst is from 0.5 to 30 molar times, preferably from 2 to 20 molar times the amount of the amic acid ester groups. The imidization degree of the obtainable polymer may be controlled by adjusting the amount of the catalyst, the temperature and the reaction time. Since the added catalyst and the like remain in the solution after the imidization reaction, it is preferred that the obtained imidized polymer is recovered and dissolved in an organic solvent again to obtain the liquid crystal aligning agent of the present invention by the following means.

In a case where the polyimide is produced from the polyamic acid, chemical imidization of adding a catalyst to a solution of the polyamic acid obtained by the reaction of the diamines and tetracarboxylic dianhydride is easily conducted. Chemical imidization is preferred in that the imidization reaction will proceed at a relatively low temperature, and a decrease in the molecular weight of the obtainable polymer is less likely to occur in the procedure of imidization.

Chemical imidization may be carried out by stirring the polyamic acid to be imidized in an organic solvent in the presence of a basic catalyst and an acid anhydride. As the organic solvent, the solvent to be used in the above-described polymerization reaction may be used. The basic catalyst may, for example, be pyridine, triethylamine, trimethylamine, tributylamine or trioctylamine. Among them, pyridine, which has appropriate basicity to make the reaction proceed, is preferred. Further, the acid anhydride may, for example, be acetic anhydride, trimellitic anhydride or pyromellitic anhydride, and among them, acetic anhydride is preferred, whereby purification after completion of the reaction will be easy.

The temperature at which the imidization reaction is carried out is from −20° C. to 140° C., preferably from 0° C.

to 100° C., and the reaction time is from 1 to 100 hours. The amount of the basic catalyst is from 0.5 to 30 molar times, preferably from 2 to 20 molar times the amount of the amic acid groups, and the amount of the acid anhydride is from 1 to 50 molar times, preferably from 3 to 30 molar times the amount of the amic acid groups. The imidization degree of the obtainable polymer may be controlled by adjusting the amount of the catalyst, the reaction temperature and the reaction time.

Since the added catalyst and the like remain in the solution after the imidization reaction of the polyamic acid ester or the polyamic acid, it is preferred that the obtained imidized polymer is recovered and dissolved again in an organic solvent to obtain the liquid crystal aligning agent of the present invention by the following means.

By pouring the solution of the polyimide obtained as mentioned above into a poor solvent with well stirring, the polymer can be precipitated. Precipitation is carried out several times, and the precipitate is washed with a poor solvent and dried at room temperature or by heating, whereby a powder of a purified polyamic acid ester can be obtained.

The poor solvent is not particularly limited and may, for example, be methanol, acetone, hexane, butyl cellosolve, heptane, methyl ethyl ketone, methyl isobutyl ketone, ethanol, toluene or benzene.

<Liquid Crystal Aligning Agent>

The liquid crystal aligning agent of the present invention is in the form of a solution having at least one polymer selected from the group consisting of a polyimide precursor having the structural units represented by the above formula (1) and the structural units represented by the above formula (2) and an imidized polymer of the polyimide precursor (hereinafter sometimes referred to as a specific structure polymer) dissolved in an organic solvent.

The molecular weight of the specific structure polymer is, by the weight average molecular weight, preferably from 2,000 to 500,000, more preferably from 5,000 to 300,000, further preferably from 10,000 to 100,000. Further, the number average molecular weight is preferably from 1,000 to 250,000, more preferably from 2,500 to 150,000, further preferably from 5,000 to 50,000.

The concentration of the polymer in the liquid crystal aligning agent used in the present invention may be properly changed depending upon the desired thickness of the coating film to be formed, and it is preferably at least 1 wt % from the viewpoint such that a uniform coating film without defect is to be formed, and is preferably at most 10 wt % in view of the storage stability of the solution.

The organic solvent contained in the liquid crystal aligning agent used in the present invention is not particularly limited so long as the specific structure polymer is uniformly soluble in it.

It may, for example, be N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone or 4-hydroxy-4-methyl-2-pentanone.

Among them, it is preferred to use N-methyl-2-pyrrolidone, N-ethyl-2-pyrrolidone or γ-butyrolactone.

Further, in a case where the solubility of the polymer of the present invention in a solvent is high, it is preferred to use a solvent represented by any of the above formulae [D-1] to [D-3].

The amount of the good solvent in the liquid crystal aligning agent of the present invention is preferably from 20 to 99 mass %, more preferably from 20 to 90 mass %, particularly preferably from 30 to 80 mass % in the whole of the solvents contained in the liquid crystal aligning agent.

The liquid crystal aligning agent of the present invention may contain a solvent which improves the coating property and the surface smoothness of a liquid crystal alignment film formed by applying the liquid crystal aligning agent (hereinafter sometimes referred to as a poor solvent) within a range not to impair the effects of the present invention. Specific examples of such a poor solvent are mentioned below, however, the poor solvent is not limited to such specific examples.

For example, ethanol, isopropyl alcohol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 2-methyl-2-pentanol, 2-ethyl-1-butanol, 1-heptanol, 2-heptanol, 3-heptanol, 1-octanol, 2-octanol, 2-ethyl-1-hexanol, cyclohexanol, 1-methylcyclohexanol, 2-methylcyclohexanol, 3-methylcyclohexanol, 1,2-ethanediol, 1,2-propanediol, 1,3-propanediol, 1,2-butanediol, 1,3-butanediol, 1,4-butanediol, 2,3-butanediol, 1,5-pentanediol, 2-methyl-2,4-pentanediol, 2-ethyl-1,3-hexanediol, dipropyl ether, dibutyl ether, dihexyl ether, dioxane, ethylene glycol dimethyl ether, ethylene glycol diethyl ether, ethylene glycol dibutyl ether, 1,2-butoxyethane, diethylene glycol dimethyl ether, diethylene glycol diethyl ether, diethylene glycol methyl ethyl ether, diethylene glycol dibutyl ether, 2-pentanone, 3-pentanone, 2-hexanone, 2-heptanone, 4-heptanone, 3-ethoxybutyl acetate, 1-methylpentyl acetate, 2-ethylbutyl acetate, 2-ethylhexyl acetate, ethylene glycol monoacetate, ethylene glycol diacetate, propylene carbonate, ethylene carbonate, 2-(methoxymethoxy)ethanol, ethylene glycol monobutyl ether, ethylene glycol monoisoamyl ether, ethylene glycol monohexyl ether, 2-(hexyloxy)ethanol, furfuryl alcohol, diethylene glycol, propylene glycol, propylene glycol monobutyl ether, 1-(butoxyethoxy)propanol, propylene glycol monomethyl ether acetate, dipropylene glycol, dipropylene glycol monomethyl ether, dipropylene glycol monoethyl ether, dipropylene glycol dimethyl ether, tripropylene glycol monomethyl ether, ethylene glycol monomethyl ether acetate, ethylene glycol monoethyl ether acetate, ethylene glycol monobutyl ether acetate, ethylene glycol monoacetate, ethylene glycol diacetate, diethylene glycol monoethyl ether acetate, diethylene glycol monobutyl ether acetate, 2-(2-ethoxyethoxy)ethyl acetate, diethylene glycol acetate, triethylene glycol, triethylene glycol monomethyl ether, triethylene glycol monoethyl ether, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, lactic acid methyl ester, lactic acid ethyl ester, lactic acid n-propyl ester, lactic acid n-butyl ester, lactic acid isoamyl ester, and solvents represented by the above formulae [D-1] to [D-3] may, for example, be mentioned.

Among them, it is preferred to use 1-hexanol, cyclohexanol, 1,2-ethanediol, 1,2-propanediol, propylene glycol monobutyl ether, ethylene glycol monobutyl ether or dipropylene glycol dimethyl ether.

The amount of such a poor solvent is preferably from 1 to 80 mass %, more preferably from 10 to 80 mass %, further preferably from 20 to 70 mass % in the whole of the solvents contained in the liquid crystal aligning agent.

The liquid crystal aligning agent of the present invention may contain, in addition to the above, within a range not to impair the effects of the present invention, a polymer other than the above specific structure polymer, a dielectric or conductive material for the purpose of changing electrical properties such as the dielectric constant or the electrical conductivity of the obtainable liquid crystal alignment film, a silane coupling agent for the purpose of improving the adhesion between the liquid crystal alignment film and the substrate, a crosslinkable compound for the purpose of increasing the hardness and the denseness of the obtainable liquid crystal alignment film, an imidization accelerator for the purpose of making the imidization by heating of the polyimide precursor at the time of baking the coating film efficiently proceed, etc.

<Method for Producing Liquid Crystal Alignment Film>

The liquid crystal alignment film of the present invention is preferably produced by a method for producing a liquid crystal alignment film which comprises a step of applying a liquid crystal aligning agent to a substrate and baking it, a step of irradiating the obtained film with polarized ultraviolet rays, and a step of subjecting the film irradiated with ultraviolet rays to a contact treatment with water or with a mixed solvent of water and an organic solvent.

In the mixed solvent of water and an organic solvent, the mixture ratio of water to the organic solvent is from 20/80 to 80/20, preferably from 40/60 to 60/40, particularly preferably 50/50 by mass ratio.

As specific examples of the organic solvent, 2-propanol, methanol, ethanol, 1-methoxy-2-propanol, ethyl lactate, diacetone alcohol, methyl 3-methoxypropionate and ethyl 3-ethoxypropionate may be mentioned. Among them, in view of solubility of a decomposed product formed by irradiation with ultraviolet rays, the organic solvent is preferably 2-propanol, methanol or ethanol, particularly preferably 2-propanol.

(1) Step of Applying Liquid Crystal Aligning Agent on Substrate and Baking it

The liquid crystal aligning agent obtained as described above is applied on a substrate, and drying and baking it, whereby a polyimide film or a film obtained by imidizing the polyimide precursor is obtained.

The substrate on which the liquid crystal aligning agent is applied to be used in the present invention is not particularly limited so long as it is a highly transparent substrate, and a glass substrate, a silicon nitride substrate or a plastic substrate such as an acrylic substrate or a polycarbonate substrate may, for example, be used, and it is preferred to use a substrate having ITO electrodes and the like to drive the liquid crystal formed thereon, in view of simplification of the process. Further, for a reflective liquid crystal display device, an opaque substrate such as a silicon wafer may be used only for a substrate on one side, and in such a case, as an electrode, a material which reflects light such as aluminum may be used. As a method of applying the liquid crystal aligning agent to be used in the present invention, a spin coating method, a printing method or an ink jet method may, for example, be mentioned.

For the drying and baking steps after application of the liquid crystal aligning agent to be used in the present invention, optional temperature and time may be selected. Usually, in order to sufficiently remove the organic solvent contained, the liquid crystal aligning agent is dried at from 50 to 120° C. for from 1 minute to 10 minutes, and baked at from 150 to 300° C. for from 5 minutes to 120 minutes. The thickness of the coating film after baking is not particularly limited, however, if the coating film is too thin, the reliability of a liquid crystal display device may be lowered in some cases, and accordingly it is from 5 to 300 nm, preferably from 10 to 200 nm.

(2) Step of Irradiating the Obtained Film with Polarized Ultraviolet Rays

Anisotropy is imparted by irradiating the film obtained by the above step (1) with polarized ultraviolet rays (hereinafter sometimes to as photo-alignment treatment).

The extinction ratio of the polarized ultraviolet rays is preferably higher, whereby higher anisotropy can be imparted. Specifically, the extinction ratio of the linearly polarized ultraviolet rays is preferably at least 10:1, more preferably at least 20:1.

As a specific example of the photo-alignment treatment, a method of irradiating the coating film surface with linearly polarized ultraviolet rays and in some cases, further subjecting the coating film to a heat treatment at a temperature of from 150 to 250° C. to impart liquid crystal alignment performance. The ultraviolet rays are preferably ultraviolet rays having a wavelength of from 100 to 400 nm, particularly preferably from 200 to 400 nm.

The amount of irradiation with ultraviolet rays is preferably within a range of from 1 to 10,000 mJ/cm$^2$, particularly preferably within a range of from 100 to 5,000 mJ/cm$^2$.

(3) Step of Subjecting Film Irradiated with Ultraviolet Rays to Contact Treatment The liquid crystal alignment film obtained from the liquid crystal aligning agent of the present invention is preferably subjected to a contact treatment with water or with a mixed solvent of water and an organic solvent, whereby more favorable properties of a liquid crystal alignment film can be achieved.

The contact treatment of the liquid crystal alignment film is preferably a treatment by which the film and the liquid are sufficiently brought into contact with each other, such as a dipping treatment or a spray treatment. The contact treatment is preferably carried out by a method of dipping the film in water or in an aqueous liquid of a mixed solvent of water and an organic solvent preferably for from 10 seconds to 1 hour, more preferably for from 1 minute to 30 minutes. The contact treatment may be carried out at room temperature but is preferably carried out at from 10 to 80° C., more preferably from 20 to 50° C. Further, as the case requires, a means to improve the contact efficiency, such as application of ultrasonic waves, may be applied.

The mixed solvent of water and an organic solvent contains water and an organic solvent in a mass ratio of preferably from 20/80 to 80/20, more preferably from 40/60 to 60/40. The organic solvent may be 2-propanol, methanol, ethanol, 1-methoxy-2-propanol, ethyl lactate, diacetone alcohol, methyl 3-methoxypropionate or ethyl 3-ethoxypropionate. Among them, preferred is 2-propanol, methanol or ethanol, particularly preferred is 2-propanol.

After the above contact treatment, for the purpose of removing the organic solvent used, either one or both of rinsing with a low boiling point solvent such as water, 2-propanol or acetone, and drying, may be carried out.

(4) Step of Heating Film

The film after the contact treatment with a solvent may be heated at from 60 to 300° C. for the purpose of drying the solvent and re-aligning the molecular chain in the film. The higher the temperature is, the more re-alignment of the molecular chain is accelerated, however, if the temperature is too high, the molecular chain may be decomposed. Accordingly, the heating temperature is preferably from 150 to 250° C., more preferably from 180 to 250° C., particularly preferably from 200 to 230° C.

If the heating time is too short, the effects of the present invention may not be obtained, and if it is too long, the molecular chain may be decomposed, and accordingly it is preferably from 10 seconds to 30 minutes, more preferably from 1 minute to 10 minutes.

<Liquid Crystal Display Device>

The liquid crystal display device of the present invention is characterized by having the liquid crystal alignment film obtained by the method for producing a liquid crystal alignment film.

The liquid crystal display device of the present invention is obtained by forming a substrate provided with a liquid crystal alignment film using the liquid crystal aligning agent of the present invention by the method for producing a liquid crystal alignment film by the above means, preparing a liquid crystal cell by a known means thereby to produce the liquid crystal display device using it.

The method for preparing a liquid crystal cell will be described with reference to a passive matrix structure liquid crystal display device as an example. The liquid crystal display device may be an active matrix structure liquid crystal display device having switching elements such as a TFT (thin film transistor) provided on the respective pixel portions constituting an image display.

First, transparent glass substrates are prepared, and common electrodes are provided on one substrate, and segment electrodes are provided on the other substrate. Such electrodes may, for example, be ITO electrodes, and are patterned so as to display a desired image. Then, on the respective substrates, an insulating film is provided so as to cover the common electrodes and the segment electrodes. The insulating film may, for example, be a film made of $SiO_2$—$TiO_2$ formed by a sol-gel method.

Then, on the respective substrates, the liquid crystal alignment film of the present invention is formed. Then, one substrate is overlaid on the other substrate so that the respective alignment films face each other, and the periphery is bonded by a sealing material. Usually, spacers are mixed with the sealing agent so as to control the gap between the substrates. Further, it is preferred to spread spacers for controlling the gap between the substrates also on an inner portion where the sealing material is not provided. An opening through which the liquid crystal is injected from the outside is provided on a part of the sealing material.

Then, through the opening provided on the sealing material, a liquid crystal material is injected into a space surrounded by the two substrates and the sealing material. Then, the opening is sealed with an adhesive. For injection, a vacuum injection method may be employed, or a method utilizing capillarity in the atmosphere may be employed. Then, polarizing plates are placed. Specifically, a pair of polarizing plates are bonded to each of the two substrates on a side opposite from the liquid crystal layer. By the above procedure, the liquid crystal display device of the present invention is obtained.

In the present invention, as the sealing agent, a resin to be cured by irradiation with ultraviolet rays or by heating, having a reactive group such as an epoxy group, an acryloyl group, a methacryloyl group, a hydroxy group, an allyl group or an acetyl group, is used. Particularly, it is preferred to use a curable resin having both reactive groups of an epoxy group and a (meth)acryloyl group.

The sealing agent of the present invention may contain an inorganic filler for the purpose of improving the bonding property and the moisture resistance. The inorganic filler to be used is not particularly limited and may, for example, be spherical silica, molten silica, crystalline silica, titanium oxide, titanium black, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, calcium silicate, aluminum silicate, lithium aluminum silicate, zirconium silicate, barium titanate, glass fibers, carbon fibers, molybdenum disulfide or asbestos, and is preferably spherical silica, molten silica, crystalline silica, titanium oxide, titanium black, silicon nitride, boron nitride, calcium carbonate, barium sulfate, calcium sulfate, mica, talc, clay, alumina, aluminum hydroxide, calcium silicate or aluminum silicate. Such inorganic fillers may be used as a mixture of two or more.

EXAMPLES

Now, the present invention will be described in further detail with reference to Examples. However, it should be understood that the present invention is by no means restricted to such specific Examples. Abbreviations of compounds and methods for measuring the respective properties used in Examples of the present invention and Comparative Examples are as follows.

NMP: N-methyl-2-pyrrolidone

BCS: butyl cellosolve

DA-A: N-tert-butoxycarbonyl-N-(2-(4-aminophenyl)ethyl)-N-(4-aminobenzyl)amine

DA-1: 1,2-bis(4-aminophenoxy)ethane

DA-2: 2-tert-butoxycarbonylaminomethyl-p-phenylenediamine (in the formula, Boc represents a tert-butoxycarbonyl group)

DA-3: N,N'-bis(4-aminophenyl)-N,N'-bis(tert-butoxycarbonyl)-1,2-diaminoethane (in the formula, Boc represents a tert-butoxycarbonyl group)

DA-5: the following formula (DA-5)

DA-6: the following formula (DA-6)

DA-7: the following formula (DA-7)

DA-8: the following formula (DA-8)

DAH-1: the following formula (DAH-1)

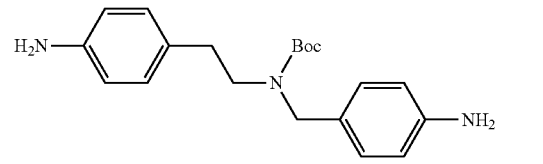

DA-A

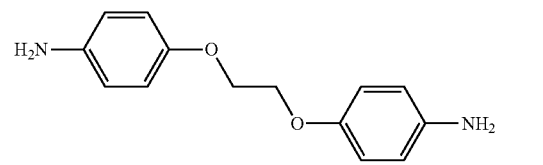

DA-1

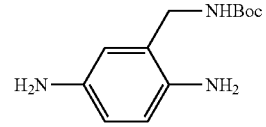

DA-2

-continued

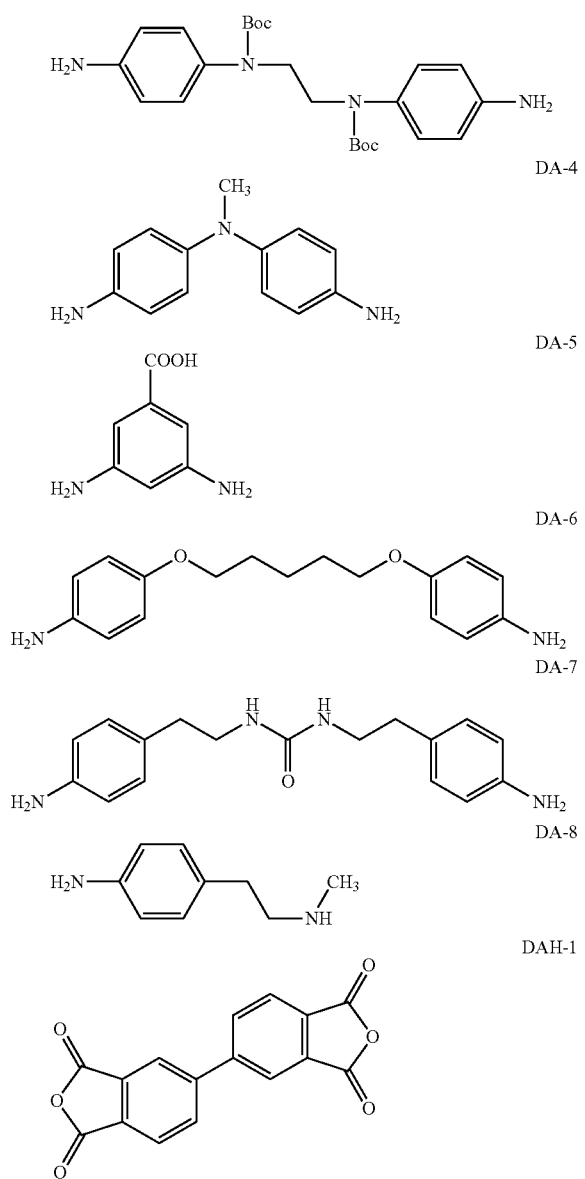

Methods for measuring the respective properties used in Examples are as follows.

[$^1$H NMR]
Apparatus: Fourier transform superconducting nuclear magnetic resonance apparatus (FT-NMR) INOVA-400 (manufactured by Varian) 400 MHz
  Solvent: Deuterated dimethyl sulfoxide (DMSO-$d_6$)
  Standard substance: Tetramethylsilane (TMS)
  Number of scans: 8 or 32

[$^{13}$C{$^1$H}NMR]
Apparatus: Fourier transform superconducting nuclear magnetic resonance apparatus (FT-NMR) INOVA-400 (manufactured by Varian) 100 MHz
  Solvent: Deuterated dimethyl sulfoxide (DMSO-$d_6$)
  Standard substance: Tetramethylsilane (TMS)
  Number of scans: 256

[DSC]
Apparatus: Differential scanning calorimetry measuring apparatus DSC1STARe system (manufactured by Mettler-Toredo International Inc.)
  Pan: sealed Au pan
  Temperature-increasing rate: 10° C./min
  Melting point: The lowest endothermic peak temperature was analyzed.

[Viscosity]
The viscosity of the polyimide precursor solution was measured using an E type viscometer TVE-22H (manufactured by Toki Sangyo Co., Ltd.) with a sample amount of 1.1 mL with cone roter TE-1 (1° 34', R24) at a temperature of 25° C.

[Molecular Weight]
With respect to the molecular weight of the polyimide precursor and an imidized polymer thereof, the number average molecular weight (hereinafter sometimes referred to as Mn) and the weight average molecular weight (hereinafter sometimes referred to as Mw) as values as calculated as polyethylene glycol and polyethylene oxide, were calculated by measurement by a GPC (room temperature gel permeation chromatography) apparatus.
  GPC apparatus: Shodex (GPC-101)
  Column: Shodex (KD803 and KD805 in series)
  Column temperature: 50° C.
  Eluent: N,N-Dimethylformamide (as additives, 30 mmol/L of lithium bromide monohydrate (LiBr.H$_2$O), 30 mmol/L of phosphoric acid anhydrous crystals (o-phosphoric acid) and 10 ml/L of tetrahydrofuran (THF))
  Flow rate: 1.0 ml/min
  Standard sample for preparation of calibration curve: TSK standard polyethylene oxide (weight average molecular weight (Mw): about 900,000, 150,000, 100,000 and 30,000) manufactured by TOSOH CORPORATION, and polyethylene glycol (peak top molecular weight (Mp): about 12,000, 4,000 and 1,000) manufactured by Polymer Laboratories Ltd. In order to prevent peaks from overlapping with one another, two kinds of samples i.e. a sample having four types of polymers with molecular weights of 900,000, 100,000, 12,000 and 1,000 mixed and a sample having three types of polymers with molecular weights of 150,000, 30,000 and 4,000 mixed, were separately subjected to measurement.

<Measurement of Imidization Degree>
20 mg of a polyimide powder was put in a NMR sample tube (NMR sampling tube standard, diameter: 5 (manufactured by KUSANO SCIENCE CORPORATION), deuterated dimethyl sulfoxide (DMSO-d6, 0.05% TMS (tetramethylsilane) mixed) (0.53 ml) was added, and ultrasonic waves were applied to completely dissolve the polyimide powder. The solution was subjected to 500 MHz proton NMR measurement by a NMR measuring apparatus (JNW-ECA500) (manufactured by JEOL Ltd. DATUM Solution Business Operations). The imidization degree was determined in accordance with the following formula from the peak integrated value of proton derived from a structure which did not change between before and after the imidization as standard proton, and the peak integrated value of proton derived from the NH group of the amide acid which appeared in the vicinity of from 9.5 ppm to 10.0 ppm.

$$\text{Imidization degree (\%)} = (1 - a \cdot x/y) \times 100$$

In the above formula, x is the peak integrated value of proton derived from the NH group of the amide acid, y is the peak integrated value of standard proton, and a is the proportion of the number of standard proton per one proton derived from the NH group of the amide acid in the case of a polyamide acid (imidization degree: 0%).

<Evaluation of Adhesion>
A sample for evaluation of adhesion was prepared as follows. A liquid crystal aligning agent was applied to an ITO substrate of 30 mm×40 mm by spin coating. The substrate was dried on a hot plate at 80° C. for 2 minutes, followed by baking by a circulating hot air oven at 230° C. for 14 minutes to obtain a coating film having a thickness of 100 nm. The coating film surface was irradiated with ultraviolet rays having a wavelength of 254 nm with an amount of irradiation of 200 mJ/cm$^2$ via a polarizing plate and further irradiated with ultraviolet rays having a wavelength of 254 nm linearly polarized with an extinction ratio of 26:1 via a polarizing plate. The substrate was dipped in pure water for 3 minutes and heated on a hot plate at 230° C. for 14 minutes to obtain a substrate provided with a liquid crystal alignment film.

Two sheets of such substrates were prepared, 4 μm bead spacers (manufactured by JGC Catalysts and Chemicals Ltd., SHINSHIKYU SW-D14.0) were applied to the liquid crystal alignment film surface of one of the substrates, and a sealing agent (manufactured by Kyoritsu Chemical & Co., Ltd., XN-1500T) was dropped on a position of 5 mm from the edge of the substrate short side. On that occasion, the amount of the sealing agent was adjusted so that the diameter of the sealing agent after bonding would be 3 mm. Then, the other substrate was bonded so that the liquid crystal alignment film surfaces faced inside and that the overlap width of the substrates would be 1 cm. The bonded two substrates were fixed with a clip, followed by heat curing at a temperature of 150° C. for 1 hour to prepare a sample.

Then, by a precision universal tester AGS-X500N manufactured by Shimadzu Corporation, edges of top and bottom substrates of a sample were fixed, a center portion of the substrates was pressed from above, and a pressure (N) at the time of peeling was measured.

<Preparation of Liquid Crystal Cell>

A liquid crystal cell with a constitution of a FFS (fringe field switching) mode liquid crystal display device was prepared as follows.

First, a substrate provided with an electrode was prepared. The substrate is a glass substrate of 30 mm×50 mm×0.7 mm in thickness. On the substrate, an ITO electrode with a solid pattern constituting a counter electrode is formed as a first layer. On the counter electrode as the first layer, a SiN (silicon nitride) film formed by a CVD method is formed as a second layer. The SiN film as the second layer has a thickness of 500 nm and functions as an interlayer dielectric film. On the SiN film as the second layer, a pectinate picture electrode formed by patterning an ITO film is arranged as a third layer, to form two pixels i.e. a first pixel and a second pixel. The size of each pixel is 10 mm×about 5 mm. The counter electrode as the first layer and the pixel electrode as the third layer are electrically insulated by the action of the SiN film as the second layer.

The pixel electrode as the third layer has a pectinate form composed of a plurality of dogleg electrode elements bending at their center portion. The width of each electrode element in a shorter direction is 3 μm, and the interval between the electrode elements is 6 μm. Since a pixel electrode forming each pixel is composed of a plurality of dogleg electrode elements bending at their center portion arranged, the shape of each pixel is not rectangular but is a bold dogleg-like shape bending at its center portion like the electrode elements. And, each pixel is horizontally divided at the bending portion at its center into two halves i.e. a first region above the bending portion and a second region below the bending portion.

By comparison between the first region and the second region of each pixel, the directions of formation of electrode elements constituting the respective regions of the pixel electrode are different. That is, based on the above-described rubbing direction of the liquid crystal alignment film, the electrode elements of the pixel electrode are formed to form an angle of +10° (clockwise) in the first region of the pixel, and the electrode elements of the pixel electrode are formed to form an angle of −10° (clockwise) in the second region of the pixel. That is, the first region and the second region of each pixel are constituted so that the directions of in-plane switching of liquid crystals induced by application of a voltage between the pixel electrode and the counter electrode are opposite from each other.

Then, the obtained liquid crystal aligning agent was subjected to filtration through a filter with a pore size of 1.0 μm, and applied to the above substrate provided with an electrode and a glass substrate having an ITO film formed on a rear side thereof and having a columnar spacer with a height of 4 μm, by spin coating and dried on a hot plate at 80° C. for 5 minutes, followed by baking by a circulating hot air oven at 230° C. for 20 minutes to form a coating film having a thickness of 100 nm. The coating film surface was irradiated with ultraviolet rays having a wavelength of 254 nm linearly polarized with an extinction ratio of at least 10:1 via a polarizing plate. Each substrate was dipped in at least one solvent selected from water and an organic solvent for at least 3 minutes and then dipped in pure water for one minute, and heated on a hot plate at from 150° C. to 300° C. for 5 minutes to obtain a substrate provided with a liquid crystal alignment film. Using such two substrates as a pair, a sealing agent was printed on one substrate, and the other substrate was bonded so that the liquid crystal alignment film surfaces faced each other and the alignment directions would be 0°, and the sealing agent was cured to prepare an empty cell. To the empty cell, liquid crystal MLC-2041 (manufactured by Merck) was vacuum-injected, and the injection inlet was sealed to obtain a FFS mode liquid crystal cell. Then, the obtained liquid crystal cell was heated at 110° C. for one hour and left to stand overnight, and then subjected to each evaluation.

<Evaluation of Residual Image Due to Long-Term Alternating-Current Drive>

To a liquid crystal cell prepared by the above method, an alternating-current voltage of ±5 V was applied at a frequency of 60 Hz for 120 hours in a constant temperature environment at 60° C. Then, the pixel electrode and the counter electrode of the liquid crystal cell were short-circuited, and the liquid crystal cell was left to stand as it was at room temperature overnight.

After the liquid crystal cell was left to stand, it was placed between two polarizing plates disposed so that the polarizing axes were at right angles to each other, and while the backlight was turned on in a state where no voltage was applied, and the angle of disposition of the liquid crystal cell was adjusted so that the brightness of the transmitted light was the smallest. And, the rotation angle when the liquid crystal cell was rotated from an angle at which the second region of the first pixel was darkest to an angle at which the first region was darkest, was calculated as an angle Δ. In the second pixel similarly, the second region and the first region are compared, and the angle Δ was calculated similarly. And, the average value of the angles Δ of the first pixel and the second pixel was calculated as the angle Δ of the liquid crystal cell, and a liquid crystal cell with an alternating-current drive baking Δ of less than 0.3 was rated as "good", and a liquid crystal cell with Δ of 0.3 or more was rated as "poor".

<Evaluation of Bright Spots of Liquid Crystal Cell (Contrast)>

The contrast of the above prepared liquid crystal cell was evaluated by black brightness. Specifically, the liquid crystal cell was placed using crossed Nicols, and the liquid crystal cell was observed with a polarizing microscope (ECLIPSE E600WPOL) (manufactured by NIKON CORPORATION) at 5-fold magnification, and the number of bright spots confirmed was counted.

A liquid crystal cell with a number of bright spots less than 10 was rated as "favorable", and a liquid crystal cell with a number of 10 or more was rated as "poor".

<Preparation of Diamine Compound>

[Preparation of Aromatic Diamine Compound (DA-A)]

An aromatic diamine compound (DA-A) was prepared in the following three steps.

Preparation Example 1

First step: Preparation of N-(2-(4-nitrophenyl)ethyl)-N-(4-nitrobenzyl)amine (DA-A-1)

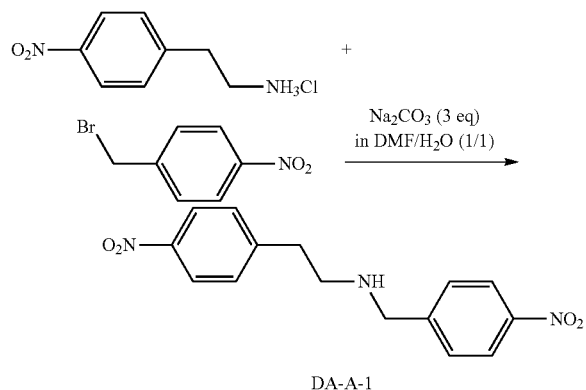

DA-A-1

2-(4-Nitrophenyl)ethylamine hydrochloride (50.0 g, 247 mmol) was dissolved in water (300 g) and DMF (50.0 g), sodium carbonate (78.4 g, 740 mmol) was added, and a DMF solution (200 g) of 4-nitrobenzyl bromide (53.3 g, 247 mmol) was dropwise added at 25° C. over a period of 1 hour. During dropwise addition, DMF/water=1/1 (w/w, 100 g) was further added to overcome stirring failure by precipitates. The mixture was stirred as it was at room temperature for 20 hours and further stirred at 40° C. for 4 hours, and disappearance of the raw materials was confirmed by high performance liquid chromatography (hereinafter referred to simply as HPLC). Then, the reaction liquid was left to cool at room temperature, and the precipitates were collected by filtration, washed twice with water (150 g) and twice with 2-propanol (50.0 g) and vacuum dried at 50° C. to obtain N-2-(4-nitrophenyl)ethyl-N-(4-nitrobenzyl)amine (white solid, amount obtained: 73 g, yield: 99%).

$^1$H NMR (DMSO-$d_6$): δ 8.18 (d, J=8.8 Hz, 2H, $C_6H_4$), 8.15 (d, J=8.8 Hz, 2H, $C_6H_4$), 7.59, (d, J=8.8 Hz, 2H, $C_6H_4$), 7.52 (d, J=8.8 Hz, 2H, $C_6H_4$), 3.87 (s, 2H, $CH_2$), 2.91 (t, J=7.0 Hz, 2H, $CH_2$), 2.80 (t, J=7.0 Hz, 2H, $CH_2$), 2.46 (s, 1H, NH). $^{13}C\{^1H\}$ NMR (DMSO-$d_6$): δ 149.8, 149.5, 146.6, 146.3, 130.3, 129.2, 123.7, 123.6, 52.4, 50.0, 36.0 (each s).

Melting point (DSC): 123° C.

Second step: Preparation of N-tert-butoxycarbonyl-N-(2-(4-nitrophenyl)ethyl)-N-(4-nitrobenzyl)amine (DA-A-2)

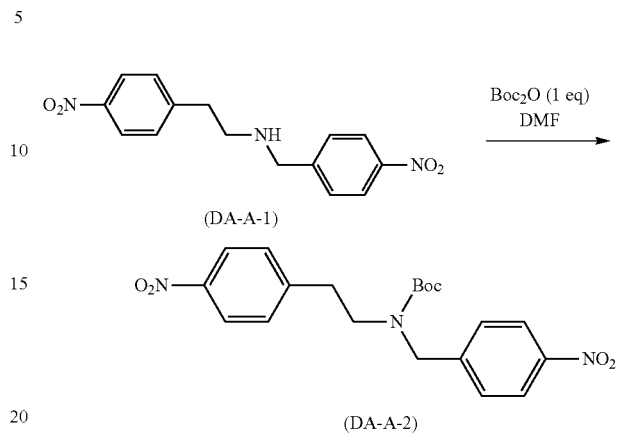

N-2-(4-Nitrophenyl)ethyl-N-4-nitrobenzylamine (73 g, 0.24 mol) was dissolved in DMF (371 g), and di-tert-butyl dicarbonate (54 g, 0.24 mol) was dropwise added at from 2 to 8° C. over a period of 10 minutes. Then, the mixture was stirred at 20° C. for 4 hours, and disappearance of the raw materials was confirmed. Then, DMF was distilled off under reduced pressure, and the reaction liquid was mixed with ethyl acetate (371 g) and washed three times with water (371 g). Then, the organic phase was concentrated to obtain an orange oil (crude amount obtained: 96 g, crude yield: 97%). The crude product was purified by silica gel column chromatography (hexane/ethyl acetate=7/3 (v/v, Rf=0.3)) to obtain a yellow oil (crude amount obtained: 82.0 g, crude yield: 82.8% (two steps)). The yellow oil was mixed with methanol (118 g) and dissolved at 50° C., and the solution was cooled with stirring, followed by stirring at from 0 to 5° C. for 30 minutes, and the solution was subjected to filtration, followed by drying to obtain N-tert-butoxycarbonyl-N-2-(4-nitrophenyl)ethyl-N-4-nitrobenzylamine (white powder, amount obtained: 74.5 g, yield: 78% (two steps)).

$^1$H NMR (DMSO-$d_6$): δ 8.22 (d, J=8.4 Hz, 2H, $C_6H_4$), 8.18-8.16 (br, 2H, $C_6H_4$), 7.51 (d, J=8.4 Hz, 2H, $C_6H_4$), 7.48 (br, 2H, $C_6H_4$), 4.57-4.54 (br, 2H, $CH_2$), 3.55-3.49 (br, 2H, $CH_2$), 2.97 (br, 2H, $CH_2$), 1.36-1.32 (br, 9H, tert-Bu). $^{13}C\{^1H\}$ NMR (DMSO-$d_6$): δ 155.2, 154.8, 147.9, 147.5, 147.1, 147.0, 146.5, 130.6, 128.7, 128.4, 124.0, 123.8, 79.7, 50.3, 49.2, 48.4, 34.3, 34.0, 28.2 (each s).

Melting point (DSC): 77° C.

Third step: Preparation of N-tert-butoxycarbonyl-N-(2-(4-aminophenyl)ethyl)-N-(4-aminobenzyl)amine (DA-A)

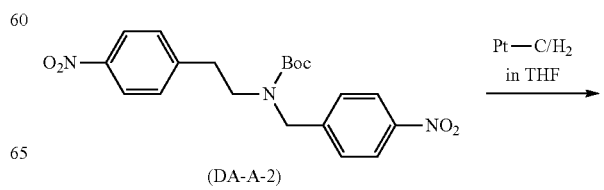

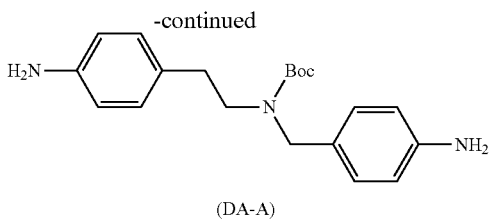

(DA-A)

N-tert-Butoxycarbonyl-N-2-(4-nitrophenyl)ethyl-N-4-nitrobenzylamine (74 g, 0.18 mol) was dissolved in tetrahydrofuran (370 g), and 3% platinum-carbon (7.4 g) was added, followed by stirring in a hydrogen atmosphere at room temperature for 72 hours. Disappearance of the raw material was confirmed by HPLC, the catalyst was removed by filtration, and the filtrate was concentrated and dried to obtain crude DA-A as a pale yellow oil (crude amount obtained: 66 g, crude yield: 105%). The crude product was dissolved in toluene (198 g) at 80° C., followed by stirring at 2° C. for one hour to precipitate crystals. The precipitated crystals were collected by filtration and dried to obtain DA-A (white powder, amount obtained: 56 g, yield: 90%).

$^1$H NMR (DMSO-d$_6$): δ 6.92 (d, J=8.0 Hz, 2H, C$_6$H$_4$), 6.84-6.76 (br, 2H, C$_6$H$_4$), 6.54 (d, J=8.0 Hz, 2H, C$_6$H$_4$), 6.50 (d, J=8.0 Hz, 2H, C$_6$H$_4$), 4.98 (s, 2H, NH$_2$), 4.84 (s, 2H, NH$_2$), 4.16 (br, 2H, CH$_2$), 3.13 (br, 2H, CH$_2$), 2.51 (br, 2H, CH$_2$), 1.41 (s, 9H, tert-Bu). $^{13}$C{$^1$H} NMR (DMSO-d$_6$): δ 155.4, 154.9, 148.2, 147.2, 129.5, 129.3, 129.1, 128.9, 126.6, 125.7, 114.5, 114.3, 78.9, 78.8, 50.2, 49.2, 48.4, 33.9, 33.3, 28.5 (each s).

Melting point (DSC): 103° C.

Example 1

Into a 100 mL four-necked flask equipped with a stirring apparatus and a nitrogen introduction tube, 2.93 g (12.00 mmol) of DA-1 and 4.43 g (11.99 mmol) of DA-A were weighed, and 81.98 g of NMP was added, followed by stirring while nitrogen was supplied, to dissolve DA-1 and DA-A. 5.35 g (23.88 mmol) of 1,3-dimethyl-1,2,3,4-cyclobutanetetracarboxylic dianhydride was added to the resulting diamine solution with stirring, and 9.11 g of NMP was further added so that the solid content concentration would be 12 mass %, followed by stirring at room temperature for 24 hours to obtain a polyamic acid solution (PAA-1). The viscosity of the polyamic acid solution at a temperature of 25° C. was 205 mPa·s. Further, Mn of the polyamic acid was 10,530 and Mw was 29,900.

15.00 g of the obtained polyamic acid solution (PAA-1) was weighed in a 100 mL Erlenmeyer flask, and 9.00 g of NMP and 6.00 g of BCS were added, followed by mixing at 25° C. for 8 hours to obtain a liquid crystal aligning agent (A-1). The liquid crystal aligning agent was confirmed to be a uniform solution without any abnormalities such as turbidity and precipitation.

Example 2

Into a 100 ml four-necked flask equipped with a stirring apparatus and a nitrogen introduction tube, 20 g of the obtained polyamic acid solution (PAA-1) was weighed, and 14.29 g of NMP was added, followed by stirring for 30 minutes. To the obtained polyamic acid solution, 1.48 g of acetic anhydride and 0.38 g of pyridine were added, followed by heating at 60° C. for 3 hours to conduct chemical imidization. The obtained reaction liquid was poured into 139 ml of methanol with stirring, and the obtained precipitate was collected by filtration and washed three times with 139 ml of methanol. The obtained resin powder was dried at 60° C. for 12 hours to obtain a polyimide resin powder.

Of the polyimide resin powder, the imidization degree was 75%, Mn was 7,120 and Mw was 12,485.

1.80 g of the obtained polyimide resin powder was weighed in a 50 ml Erlenmeyer flask in which a stirrer was put, and 13.20 g of NMP was added, followed by stirring at 40° C. for 24 hours to dissolve the polyimide resin powder to obtain a polyimide solution (PI-1). Further, 10.00 g of the obtained polyimide solution (PI-1) was weighed in a 100 mL Erlenmeyer flask, and 6.02 g of NMP and 4.00 g of BCS were added, followed by mixing at 25° C. for 8 hours to obtain a liquid crystal aligning agent (A-2). The liquid crystal aligning agent was confirmed to be a uniform solution without any abnormalities such as turbidity and precipitation.

Example 3

Into a 100 mL four-necked flask equipped with a stirring apparatus and a nitrogen introduction tube, 3.52 g (14.40 mmol) of DA-1 and 3.55 g (9.60 mmol) of DA-A were weighed, and 81.60 g of NMP was added, followed by stirring while nitrogen was supplied to dissolve DA-1 and DA-A. 5.30 g (23.64 mmol) of 1,3-dimethyl-1,2,3,4-cyclobutanetetracarboxylic dianhydride was added to the resulting diamine solution with stirring, and 9.07 g of NMP was further added so that the solid content concentration would be 12 mass %, followed by stirring at room temperature for 24 hours to obtain a polyamic acid solution (PAA-2). The viscosity of the polyamic acid solution at a temperature of 25° C. was 230 mPa·s. Further, Mn of the polyamic acid was 19,890 and Mw was 39,960.

Into a 100 ml four-necked flask equipped with a stirring apparatus and a nitrogen introduction tube, 25 g of the obtained polyamic acid solution (PAA-2) was weighed, and 8.33 g of NMP was added, followed by stirring for 30 minutes. To the obtained polyamic acid solution, 1.78 g of acetic anhydride and 0.46 g of pyridine were added, followed by heating at 55° C. for 3 hours to conduct chemical imidization. The obtained reaction liquid was poured into 137 ml of methanol with stirring, and the obtained precipitate was collected by filtration and washed three times with 140 ml of methanol. The obtained resin powder was dried at 60° C. for 12 hours to obtain a polyimide resin powder.

Of the polyimide resin powder, the imidization degree was 67%, Mn was 13,480 and Mw was 24,000.

Into a 50 ml Erlenmeyer flask in which a stirrer was put, 2.42 g of the obtained polyimide resin powder was weighed, and 17.75 g of NMP was added, followed by stirring at 40° C. for 24 hours to dissolve the polyimide resin powder to obtain a polyimide solution (PI-2). Further, 10.00 g of the obtained polyimide solution (PI-2) was weighed in a 100 mL Erlenmeyer flask, and 6.00 g of NMP and 4.00 g of BCS were added, followed by mixing at 25° C. for 8 hours to obtain a liquid crystal aligning agent (A-3). The liquid crystal aligning agent was confirmed to be a uniform solution without any abnormalities such as turbidity and precipitation.

Example 4

Into a 100 mL four-necked flask equipped with a stirring apparatus and a nitrogen introduction tube, 2.25 g (9.20 mmol) of DA-1 and 5.10 g (13.80 mmol) of DA-A were weighed, and 82.47 g of NMP was added, followed by stirring while nitrogen was supplied to dissolve DA-1 and DA-A. 5.15 g (22.98 mmol) of 1,3-dimethyl-1,2,3,4-cyclobutanetetracarboxylic dianhydride was added to the resulting diamine solution with stirring, and 9.07 g of NMP was further added so that the solid content concentration would be 12 mass %, followed by stirring at room temperature for 24 hours to obtain a polyamic acid solution (PAA-3). The viscosity of the polyamic acid solution at a temperature of 25° C. was 120 mPa·s. Further, Mn of the polyamic acid was 12,120 and Mw was 29,310.

Into a 100 ml four-necked flask equipped with a stirring apparatus and a nitrogen introduction tube, 25 g of the obtained polyamic acid solution (PAA-3) was weighed, and 8.33 g of NMP was added, followed by stirring for 30 minutes. To the obtained polyamic acid solution, 1.69 g of acetic anhydride and 0.44 g of pyridine were added, followed by heating at 55° C. for 3 hours to conduct chemical imidization. The obtained reaction liquid was poured into 136 ml of methanol with stirring, and the obtained precipitate was collected by filtration and washed three times with 136 ml of methanol. The obtained resin powder was dried at 60° C. for 12 hours to obtain a polyimide resin powder.

Of the polyimide resin powder, the imidization degree was 68%, Mn was 8,300 and Mw was 22,020.

Into a 50 ml Erlenmeyer flask in which a stirrer was put, 2.38 g of the obtained polyimide resin powder was weighed, and 17.45 g of NMP was added, followed by stirring at 40° C. for 24 hours to dissolve the polyimide resin powder to obtain a polyimide solution (PI-3). Further, 10.00 g of the obtained polyimide solution (PI-3) was weighed in a 100 mL Erlenmeyer flask, and 6.00 g of NMP and 4.00 g of BCS were added, followed by mixing at 25° C. for 8 hours to obtain a liquid crystal aligning agent (A-4). The liquid crystal aligning agent was confirmed to be a uniform solution without any abnormalities such as turbidity and precipitation.

Example 5

Into a 100 mL four-necked flask equipped with a stirring apparatus and a nitrogen introduction tube, 0.54 g (5.00 mmol) of p-phenylenediamine, 1.83 g (7.50 mmol) of DA-1 and 4.62 g (12.50 mmol) of DA-A were weighed, and 82.57 g of NMP was added, followed by stirring while nitrogen was supplied to dissolve p-phenylenediamine, DA-1 and DA-A. 5.57 g (24.83 mmol) of 1,3-dimethyl-1,2,3,4-cyclobutanetetracarboxylic dianhydride was added to the resulting diamine solution with stirring, and 9.17 g of NMP was further added so that the solid content concentration would be 12 mass %, followed by stirring at room temperature for 24 hours to obtain a polyamic acid solution (PAA-4). The viscosity of the polyamic acid solution at a temperature of 25° C. was 132 mPa·s. Further, Mn of the polyamic acid was 19,150 and Mw was 34,500.

Into a 100 mL four-necked flask equipped with a stirring apparatus and a nitrogen introduction tube, 25 g of the obtained polyamic acid solution (PAA-4) was weighed, and 9.17 g of NMP was added, followed by stirring for 30 minutes. To the obtained polyamic acid solution, 3.66 g of acetic anhydride and 0.95 g of pyridine were added, followed by heating at 55° C. for 3 hours to conduct chemical imidization. The obtained reaction liquid was poured into 320 ml of methanol with stirring, and the obtained precipitate was collected by filtration and washed three times with 140 ml of methanol. The obtained resin powder was dried at 60° C. for 12 hours to obtain a polyimide resin powder.

Of the polyimide resin powder, the imidization degree was 75%, Mn was 13,930 and Mw was 30,010.

Into a 50 ml Erlenmeyer flask in which a stirrer was put, 3.60 g of the obtained polyimide resin powder was weighed, and 26.40 g of NMP was added, followed by stirring at 40° C. for 24 hours to dissolve the polyimide resin powder to obtain a polyimide solution (PI-4). Further, 10.00 g of the obtained polyimide solution (PI-4) was weighed in a 100 mL Erlenmeyer flask, and 6.00 g of NMP and 4.00 g of BCS were added, followed by mixing at 25° C. for 8 hours to obtain a liquid crystal aligning agent (A-4). The liquid crystal aligning agent was confirmed to be a uniform solution without any abnormalities such as turbidity and precipitation.

Example 6

Into a 100 mL four-necked flask equipped with a stirring apparatus and a nitrogen introduction tube, 4.27 g (20.00 mmol) of DA-4 and 0.76 g (5.00 mmol) of DA-5 were weighed, and 31.31 g of NMP and 44.73 g of GBL were added, followed by stirring while nitrogen was supplied to dissolve DA-4 and DA-5. 7.19 g (24.45 mmol) of DAH-1 was added to the resulting diamine solution with stirring, and 13.57 g of NMP was further added so that the solid content concentration would be 12 mass %, followed by stirring at room temperature for 24 hours to obtain a polyamic acid (PAA-5) solution. The viscosity of the polyamic acid solution at a temperature of 25° C. was 810 mPa·s.

Into a 100 mL sample tube in which a stirrer was put, 22.00 g of the obtained polyamic acid solution (PAA-5) and 14.67 g of the polyimide solution (PI-1) obtained in Example 2 were weighed, and 27.33 g of NMP and 16.00 g of BCS were added, followed by stirring by a magnetic stirrer for 2 hours to obtain a liquid crystal aligning agent (A-5).

Example 7

Into a 100 mL four-necked flask equipped with a stirring apparatus and a nitrogen introduction tube, 1.43 g (5.00 mmol) of DA-6, 2.98 g (10.00 mmol) of DA-7 and 1.50 g (10.00 mmol) of DA-8 were weighed, and 65.23 g of NMP was added, followed by stirring while nitrogen was supplied to dissolve DA-6, DA-7 and DA-8. 4.56 g (23.25 mmol) of 1,2,3,4-cyclobutanetetracarboxylic dianhydride was added to the resulting diamine solution with stirring, and 29.00 g of NMP was further added so that the solid content concentration would be 10 mass %, followed by stirring at room temperature for 24 hours to obtain a polyamic acid (PAA-6) solution. The viscosity of the polyamic acid solution at a temperature of 25° C. was 190 mPa·s.

Into a 100 mL sample tube in which a stirrer was put, 22.00 g of the obtained polyamic acid solution (PAA-6) and 14.65 g of the polyimide solution (PI-1) obtained in Example 2 were weighed, and 27.36 g of NMP and 16.00 g of BCS were added, followed by stirring by a magnetic stirrer for 2 hours to obtain a liquid crystal aligning agent (A-6).

Comparative Example 1

Into a 100 mL four-necked flask equipped with a stirring apparatus and a nitrogen introduction tube, 5.37 g (21.98 mmol) of DA-1 was weighed, and 54.05 g of NMP was added, followed by stirring while nitrogen was supplied to dissolve DA-1. 4.64 g (20.70 mmol) of 1,3-dimethyl-1,2,3,4-cyclobutanetetracarboxylic dianhydride was added to the resulting diamine solution with stirring, and 9.01 g of NMP was further added so that the solid content concentration would be 10 mass %, followed by stirring at room temperature for 24 hours to obtain a polyamic acid solution (PAA-7). The viscosity of the polyamic acid solution at a temperature of 25° C. was 520 mPa·s. Further, Mn of the polyamic acid was 16,530, and Mw was 37,900.

18.00 g of the obtained polyamic acid solution (PAA-7) was weight in a 100 ml Erlenmeyer flask, and 6.00 g of NMP and 6.00 g of BCS were added, followed by mixing at 25° C. for 8 hours to obtain a liquid crystal aligning agent (B-1). The liquid crystal aligning agent was confirmed to be a uniform solution without any abnormalities such as turbidity and precipitation.

Comparative Example 2

Into a 50 mL four-necked flask equipped with a stirring apparatus and a nitrogen introduction tube, 1.71 g (7.00 mmol) of DA-1 and 1.66 g (7.00 mmol) of DA-2 were weighed, and 41.93 g of NMP was added, followed by stirring while nitrogen was supplied to dissolve DA-1 and DA-2. 2.98 g (13.31 mmol) of 1,3-dimethyl-1,2,3,4-cyclobutanetetracarboxylic dianhydride was added to the resulting diamine solution with stirring, and 4.66 g of NMP was further added so that the solid content concentration would be 12 mass %, followed by stirring at room temperature for 24 hours to obtain a polyamic acid solution (PAA-8). The viscosity of the polyamic acid solution at a temperature of 25° C. was 225 mPa·s. Further, Mn of the polyamic acid was 14,780, and Mw was 30,350.

15.00 g of the obtained polyamic acid solution (PAA-8) was weighed in a 100 ml Erlenmeyer flask, and 9.00 g of NMP and 6.00 g of BCS were added, followed by mixing at 25° C. for 8 hours to obtain a liquid crystal aligning agent (B-2). The liquid crystal aligning agent was confirmed to be a uniform solution without any abnormalities such as turbidity and precipitation.

Comparative Example 3

Into a 50 mL four-necked flask equipped with a stirring apparatus and a nitrogen introduction tube, 1.34 g (5.50 mmol) of DA-1 and 2.43 g (5.50 mmol) of DA-3 were weighed, and 40.39 g of NMP was added, followed by stirring while nitrogen was supplied to dissolve DA-1 and DA-3. 2.35 g (10.49 mmol) of 1,3-dimethyl-1,2,3,4-cyclobutanetetracarboxylic dianhydride was added to the resulting diamine solution with stirring, and 4.49 g of NMP was further added so that the solid content concentration would be 12 mass %, followed by stirring at room temperature for 24 hours to obtain a polyamic acid solution (PAA-9). The viscosity of the polyamic acid solution at a temperature of 25° C. was 185 mPa·s. Further, Mn of the polyamic acid was 20,600, and Mw was 42,900.

15.00 g of the obtained polyamic acid solution (PAA-9) was weighed in a 100 ml Erlenmeyer flask, and 9.00 g of NMP and 6.00 g of BCS were added, followed by mixing at 25° C. for 8 hours to obtain a liquid crystal aligning agent (B-3). The liquid crystal aligning agent was confirmed to be a uniform solution without any abnormalities such as turbidity and precipitation.

The details of the liquid crystal aligning agents (A-1) to (A-7) obtained in Examples 1 to 2 and the liquid crystal aligning agents (B-1) to (B-3) obtained in Comparative Examples 1 to 3 are shown in the following Table 1.

TABLE 1

| | Liquid crystal aligning agent | Polymer | Diamine |
|---|---|---|---|
| Example 1 | (A-1) | Polyamic acid (PAA-1) | DA-1, DA-A |
| Example 2 | (A-2) | Polyimide (PI-1) | DA-1, DA-A |
| Example 3 | (A-3) | Polyimide (PI-2) | DA-1, DA-A |
| Example 4 | (A-4) | Polyimide (PI-3) | DA-1, DA-A |
| Example 5 | (A-5) | Polyimide (PI-4) | DA-1, DA-A, p-phenylenediamine |
| Example 6 | (A-6) | Polyimide (PI-1) Polyamic acid (PAA-5) | DA-1, DA-A, DA-4, DA-5 |
| Example 7 | (A-7) | Polyimide (PI-1) Polyamic acid (PAA-6) | DA-1, DA-A, DA-6, DA-7, DA-8 |
| Comparative Example 1 | (B-1) | Polyamic acid (PAA-7) | DA-1 |
| Comparative Example 2 | (B-2) | Polyamic acid (PAA-8) | DA-1, DA-2 |
| Comparative Example 3 | (B-3) | Polyamic acid (PAA-9) | DA-1, DA-3 |

Example 8

The liquid crystal aligning agent (A-1) obtained in Example 1 was subjected to filtration through a filter with a pore size of 1.0 μm, and a sample was prepared by the above method <Evaluation of adhesion> and subjected to evaluation of seal adhesion. The adhesion strength was 12.7N.

Example 9

A sample was prepared by the above method <Evaluation of adhesion> except that after irradiation with polarized ultraviolet rays, the substrate was dipped in a mixed solution of pure water/2-propanol=1/1 for 3 minutes and then dipped in pure water for one minute, instead of dipping in pure water for 3 minutes, and seal adhesion was evaluated and as a result, the strength at the time of peeling was 13.2N.

Example 10

A sample was prepared in the same manner as the above method <Evaluation of adhesion> except that the liquid crystal aligning agent (A-2) obtained in Example 2 was used instead of the liquid crystal aligning agent (A-1) obtained in Example 1, and seal adhesion was evaluated and as a result, the strength at the time of peeling was 11.0N.

Example 11

A sample was prepared in the same manner as the above method <Evaluation of adhesion> except that the liquid crystal aligning agent (A-2) obtained in Example 2 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 11.0N.

Example 12

A sample was prepared in the same manner as the above method <Evaluation of adhesion> except that the liquid crystal aligning agent (A-3) obtained in Example 3 was used instead of the liquid crystal aligning agent (A-1) obtained in Example 1, and seal adhesion was evaluated and as a result, the strength at the time of peeling was 10.2N.

Example 13

A sample was prepared in the same manner as the above method <Evaluation of adhesion> except that the liquid crystal aligning agent (A-3) obtained in Example 3 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 10.3N.

Example 14

A sample was prepared in the same manner as the above method <Evaluation of adhesion> except that the liquid crystal aligning agent (A-4) obtained in Example 4 was used instead of the liquid crystal aligning agent (A-1) obtained in Example 1, and seal adhesion was evaluated and as a result, the strength at the time of peeling was 15.1N.

Example 15

A sample was prepared in the same manner as the above method <Evaluation of adhesion> except that the liquid crystal aligning agent (A-4) obtained in Example 4 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 15.4N.

Example 16

A sample was prepared in the same manner as the above method <Evaluation of adhesion> except that the liquid crystal aligning agent (A-5) obtained in Example 5 was used instead of the liquid crystal aligning agent (A-1) obtained in Example 1, and seal adhesion was evaluated and as a result, the strength at the time of peeling was 12.9N.

Example 17

A sample was prepared in the same manner as the above method <Evaluation of adhesion> except that the liquid crystal aligning agent (A-5) obtained in Example 5 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 13.1N.

Example 18

A sample was prepared in the same manner as the above method <Evaluation of adhesion> except that the liquid crystal aligning agent (A-6) obtained in Example 6 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 25.2N.

Example 19

A sample was prepared in the same manner as the above method <Evaluation of adhesion> except that the liquid crystal aligning agent (A-7) obtained in Example 7 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes, and seal adhesion was evaluated and as a result, the strength at the time of peeling was 20.0N.

Comparative Example 4

A sample was prepared in the same manner as the above method <Evaluation of adhesion> except that the liquid crystal aligning agent (B-1) obtained in Comparative Example 1 was used, and seal adhesion was evaluated and as a result, the strength at the time of peeling was 3.7N.

Comparative Example 5

A sample was prepared in the same manner as the above method <Evaluation of adhesion> except that the liquid crystal aligning agent (B-2) obtained in Comparative Example 2 was used, and seal adhesion was evaluated and as a result, the strength at the time of peeling was 8.0N.

Comparative Example 6

A sample was prepared in the same manner as the above method <Evaluation of adhesion> except that the liquid crystal aligning agent (B-3) obtained in Comparative Example 2 was used, and seal adhesion was evaluated and as a result, the strength at the time of peeling was 7.3N.

TABLE 2

| | Liquid crystal aligning agent | Solvent in contact treatment | Adhesion strength [N] |
|---|---|---|---|
| Example 8 | (A-1) | Pure water | 12.7 |
| Example 9 | (A-1) | Pure water/2-propanol = 1/1 | 13.2 |
| Example 10 | (A-2) | Pure water | 11.0 |
| Example 11 | (A-2) | Pure water/2-propanol = 1/1 | 11.0 |
| Example 12 | (A-3) | Pure water | 10.2 |
| Example 13 | (A-3) | Pure water/2-propanol = 1/1 | 10.3 |
| Example 14 | (A-4) | Pure water | 15.1 |
| Example 15 | (A-4) | Pure water/2-propanol = 1/1 | 15.4 |
| Example 16 | (A-5) | Pure water | 12.9 |
| Example 17 | (A-5) | Pure water/2-propanol = 1/1 | 13.1 |
| Example 18 | (A-6) | Pure water/2-propanol = 1/1 | 25.2 |
| Example 19 | (A-7) | Pure water/2-propanol = 1/1 | 20.0 |

TABLE 2-continued

|  | Liquid crystal aligning agent | Solvent in contact treatment | Adhesion strength [N] |
| --- | --- | --- | --- |
| Comparative Example 4 | (B-1) | Pure water | 3.7 |
| Comparative Example 5 | (B-2) | Pure water | 8.0 |
| Comparative Example 6 | (B-3) | Pure water | 7.3 |

Example 20

The liquid crystal aligning agent (A-1) obtained in Example 1 was subjected to filtration through a filter with a pore size of 1.0 μm, and applied to the above substrate provided with an electrode and a glass substrate having an ITO film formed on a rear side thereof and having a columnar spacer with a height of 4 μm, by spin coating and dried on a hot plate at 80° C. for 5 minutes, followed by baking by a circulating hot air oven at 230° C. for 20 minutes to obtain a coating film having a thickness of 100 nm. The coating film surface was irradiated with ultraviolet rays having a wavelength of 254 nm linearly polarized with an extinction ratio of 26:1 with an amount of irradiation of 0.2 J/cm$^2$ via a polarizing plate. Each substrate was dipped in pure water for 3 minutes and dried on a hot plate at 230° C. for 14 minutes to obtain a substrate provided with a liquid crystal alignment film. Using such two substrates as a pair, a sealing agent was printed on one substrate, and the other substrate was bonded so that the liquid crystal alignment film surfaces faced each other and the alignment directions would be 0°, and the sealing agent was cured to prepare an empty cell. To the empty cell, liquid crystal MLC-2041 (manufactured by Merck) was vacuum-injected, and the injection inlet was sealed to obtain a FFS mode liquid crystal cell. Then, the obtained liquid crystal cell was heated at 110° C. for 1 hour and left to stand overnight, and evaluation of residual image due to long-term alternating-current drive was carried out. The value of the angle Δ of the liquid crystal cell after long-term alternating-current drive was at most 0.3 degree, such being favorable. Further, as a result of observation of bright spots in the cell, the number of bright spots was less than 10, such being favorable.

Example 21

A FFS mode liquid crystal cell was prepared in the same manner as in Example 20 except that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of observation of bright spots in the cell, the number of bright spots was less than 10, such being favorable.

Example 22

A FFS mode liquid crystal cell was prepared in the same manner as in Example 20 except that the liquid crystal aligning agent (A-2) obtained in Example 2 was used instead of the liquid crystal aligning agent (A-1) obtained in Example 1. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of observation of bright spots in the cell, the number of bright spots was less than 10, such being favorable.

Example 23

A FFS mode liquid crystal cell was prepared in the same manner as in Example 20 except that the liquid crystal aligning agent (A-3) obtained in Example 3 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of evaluation of bright spots in the cell, the number of bright spots was less than 10, such being favorable.

Example 24

A FFS mode liquid crystal cell was prepared in the same manner as in Example 20 except that the liquid crystal aligning agent (A-4) obtained in Example 4 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of evaluation of bright spots in the cell, the number of bright spots was less than 10, such being favorable.

Example 25

A FFS mode liquid crystal cell was prepared in the same manner as in Example 20 except that the liquid crystal aligning agent (A-5) obtained in Example 5 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of evaluation of bright spots in the cell, the number of bright spots was less than 10, such being favorable.

Example 26

A FFS mode liquid crystal cell was prepared in the same manner as in Example 20 except that the liquid crystal aligning agent (A-6) obtained in Example 6 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of evaluation of bright spots in the cell, the number of bright spots was less than 10, such being favorable.

Example 27

A FFS mode liquid crystal cell was prepared in the same manner as in Example 20 except that the liquid crystal aligning agent (A-7) obtained in Example 7 was used instead of the liquid crystal aligning agent (A-1) obtained in Example 1 and that after irradiation with polarized ultraviolet rays, the substrate was dipped in a mixed solution of pure water/2-propanol=1/1 for 3 minutes and then dipped in pure water for one minute instead of dipping in pure water for 3 minutes. The FFS mode liquid crystal cell was subjected to evaluation of residual image due to long-term alternating-current drive. The angle Δ of the liquid crystal cell after long-term alternating-current drive was at most 0.3 degree, such being favorable. Further, as a result of evaluation of bright spots in the cell, the number of bright spots was less than 10, such being favorable.

Comparative Example 7

A FFS mode liquid crystal cell was prepared in the same manner as in Example 20 except that the liquid crystal aligning agent (B-1) obtained in Comparative Example 1 was used instead of the liquid crystal aligning agent (A-1) obtained in Example 1. The FFS mode liquid crystal cell was subjected to evaluation of residual image by long-term alternating-current drive. The angle Δ of the liquid crystal cell after long-term alternating-current drive was at least 0.3 degree, such being unfavorable. Further, as a result of observation of bright spots in the cell, the number of bright spots was at least 10, such being unfavorable.

Comparative Example 8

A FFS mode liquid crystal cell was prepared in the same manner as in Example 20 except that the liquid crystal aligning agent (B-2) obtained in Comparative Example 2 was used instead of the liquid crystal aligning agent (A-1) obtained in Example 1. The FFS mode liquid crystal cell was subjected to evaluation of residual image by long-term alternating-current drive. The angle Δ of the liquid crystal cell after long-term alternating-current drive was at least 0.3 degree, such being unfavorable. Further, as a result of observation of bright spots in the cell, the number of bright spots was at least 10, such being unfavorable.

Comparative Example 9

A FFS mode liquid crystal cell was prepared in the same manner as in Example 20 except that the liquid crystal aligning agent (B-3) obtained in Comparative Example 3 was used instead of the liquid crystal aligning agent (A-1) obtained in Example 1. The FFS mode liquid crystal cell was subjected to evaluation of residual image by long-term alternating-current drive. The angle Δ of the liquid crystal cell after long-term alternating-current drive was at least 0.3 degree, such being unfavorable. Further, as a result of observation of bright spots in the cell, the number of bright spots was at least 10, such being unfavorable.

INDUSTRIAL APPLICABILITY

By using the liquid crystal aligning agent of the present invention, a liquid crystal alignment film which has high seal adhesion can be obtained. Further, with the liquid crystal alignment film obtained from the liquid crystal aligning agent of the present invention, it is possible to obtain an IPS mode or FFS mode liquid crystal display device which has few bright spots which may cause a decrease in the contrast, of which a residual image due to alternating-current drive in an IPS mode or FFS mode liquid crystal display device is reduced, and which is excellent in the residual image property. Accordingly, the present invention is useful for a liquid crystal display device for which high image quality is required.

The entire disclosure of Japanese Patent Application No. 2013-220596 filed on Oct. 23, 2013 including specification, claims, drawings and summary is incorporated herein by reference in its entirety.

The invention claimed is:

1. A liquid crystal aligning agent comprising at least one polymer selected from the group consisting of a polyimide precursor having both of structural units represented by the following formula (1) and structural units represented by the following formula (2) and an imidized polymer thereof:

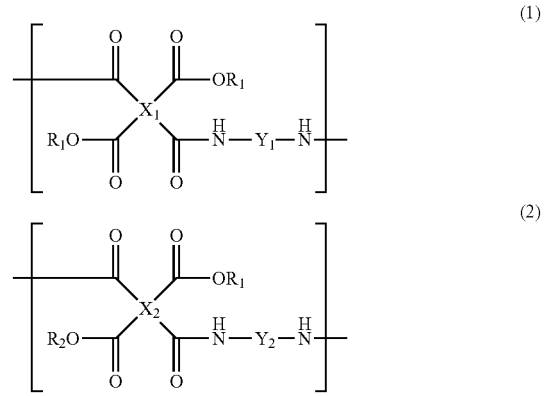

wherein each of $X_1$ and $X_2$ is a tetravalent organic group represented by the formula (XA-1), $Y_1$ is a bivalent organic group represented by the following formula (Y1-1), $Y_2$ is a bivalent organic group represented by the following formula (Y2-1) or (Y2-2), and each of $R_1$ and $R_2$ which are independent of each other, is a hydrogen atom or a $C_{1-5}$ alkyl group:

wherein each of $R_3$, $R_4$, $R_5$ and $R_6$ which are independent of one another, is a hydrogen atom, a halogen atom, a $C_{1-6}$ alkyl group, a $C_{2-6}$ alkenyl group, a $C_{2-6}$ alkynyl group or a phenyl group;

(Y1-1)

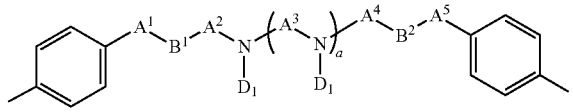

wherein each of $A^1$ and $A^5$ which are independent of each other, is a single bond or a $C_{1-5}$ alkylene group, each of $A^2$ and $A^4$ which are independent of each other, is a $C_{1-5}$ alkylene group, $A^3$ is a $C_{1-6}$ alkylene group or a cycloalkylene group, each of $B^1$ and $B^2$ which are independent of each other, is a single bond, —O—, —NH—, —NMe-, —C(=O)—, —C(=O)O—, —C(=O)NH—, —C(=O)NMe-, —OC(=O)—, —NHC(=O)— or —N(Me)C(=O)—, $D_1$ is a group to be replaced with a hydrogen atom by heat, and a is 0 or 1;

(Y2-1)

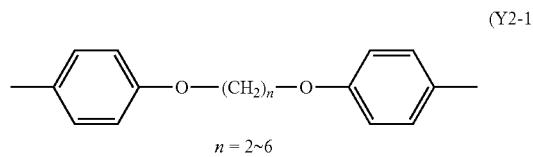

n = 2~6

(Y2-2)

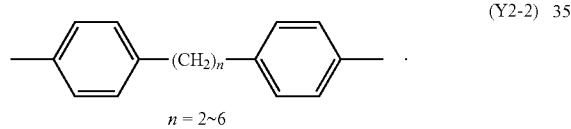

n = 2~6

2. The liquid crystal aligning agent according to claim 1, wherein the polyimide precursor has the structural units represented by the formula (1) in an amount of from 20 to 80 mol % and the structural units represented by the formula (2) in an amount of from 80 to 20 mol % based on all the structural units.

3. The liquid crystal aligning agent according to claim 1, wherein $Y_1$ in the structural units represented by the above formula (1) is at least one member selected from the group consisting of structures represented by the following formulae (1-1) to (1-4):

(1-1)

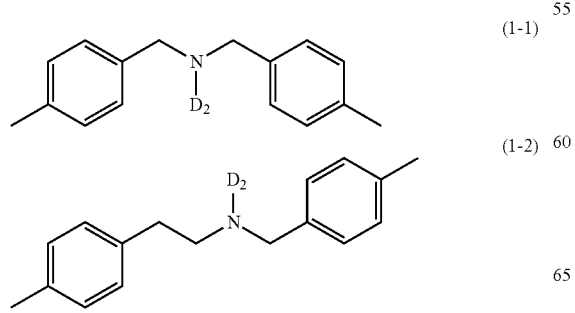

(1-2)

(1-3)

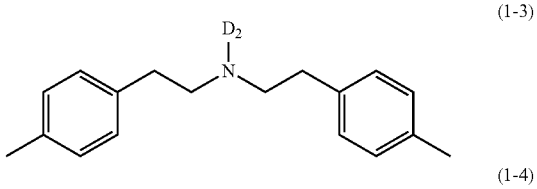

(1-4)

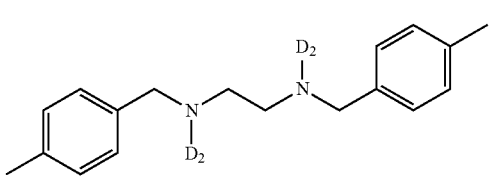

wherein $D_2$ is a tert-butoxycarbonyl group or a 9-fluorenylmethoxycarbonyl group.

4. The liquid crystal aligning agent according to claim 3, wherein $Y_1$ in the structural units represented by the above formula (1) is represented by the above formula (1-2).

5. The liquid crystal aligning agent according to claim 3, wherein wherein $Y_1$ in the structural units represented by the above formula (1) is represented by the above formula (1-1).

6. The liquid crystal aligning agent according to claim 3, wherein wherein $Y_1$ in the structural units represented by the above formula (1) is represented by the above formula (1-3).

7. The liquid crystal aligning agent according to claim 3, wherein wherein $Y_1$ in the structural units represented by the above formula (1) is represented by the above formula (1-4).

8. The liquid crystal aligning agent according to claim 1, wherein $Y_2$ in the structural units represented by the above formula (2) is represented by the following formula (Y2-3):

(Y2-3)

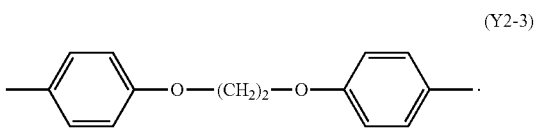

9. The liquid crystal aligning agent according to claim 1, wherein each of $X_1$ in the structural units represented by the above formula (1) and $X_2$ in the structural units represented by the above formula (2) which are independent of each other, is represented by the following formula (X1-1) or (X1-2):

(X1-1)

(X1-2)

10. A method for producing a liquid crystal alignment film, which comprises applying and baking the liquid crystal aligning agent according to claim 1 to form a film, irradiating the obtained film with polarized ultraviolet rays, and subjecting the film to a contact treatment with water or with a mixed solvent of water and an organic solvent.

11. The method for producing a liquid crystal alignment film according to claim 10, wherein the mixed solvent of water and an organic solvent comprises water and an organic solvent in a mass ratio of from 20/80 to 80/20.

12. The method for producing a liquid crystal alignment film according to claim 10, wherein the organic solvent is 2-propanol, methanol, ethanol, 1-methoxy-2-propanol, ethyl lactate, diacetone alcohol, methyl 3-methoxypropionate or ethyl 3-ethoxypropionate.

13. The method for producing a liquid crystal alignment film according to claim 10, wherein the organic solvent is 2-propanol, methanol or ethanol.

14. The method for producing a liquid crystal alignment film according to claim 10, wherein after the contact treatment, the film is heated at 150° C. or higher.

15. A liquid crystal alignment film obtained by the method for producing a liquid crystal alignment film according to claim 10.

16. A liquid crystal display device comprising the liquid crystal alignment film according to claim 15.

* * * * *